United States Patent
Liu et al.

(10) Patent No.: US 11,028,226 B2
(45) Date of Patent: Jun. 8, 2021

(54) HEAT RESISTANT POLYIMIDE FILM AND PREPARATION METHOD THEREOF

(71) Applicant: Institute of Petroleum Chemistry, Heilongjiang Academy of Sciences, Harbin (CN)

(72) Inventors: Changwei Liu, Harbin (CN); Wanbao Xiao, Harbin (CN); Chunyan Qu, Harbin (CN); Dezhi Wang, Harbin (CN); Kai Xu, Harbin (CN); Bo Wang, Harbin (CN); Hongfeng Li, Harbin (CN); Hao Feng, Harbin (CN); Yueyu Guan, Harbin (CN); Haidong Yang, Harbin (CN); Haimin Wang, Harbin (CN); Yang Zhang, Harbin (CN); Cheng Du, Harbin (CN); Dongpeng Zhou, Harbin (CN)

( * ) Notice: Subject to any disclaimer, the term of this patent is extended or adjusted under 35 U.S.C. 154(b) by 292 days.

(21) Appl. No.: 16/307,897

(22) PCT Filed: Nov. 2, 2017

(86) PCT No.: PCT/CN2017/109142
§ 371 (c)(1),
(2) Date: Dec. 6, 2018

(87) PCT Pub. No.: WO2019/075786
PCT Pub. Date: Apr. 25, 2019

(65) Prior Publication Data
US 2020/0172676 A1    Jun. 4, 2020

(30) Foreign Application Priority Data
Oct. 16, 2017   (CN) .......................... 201710960267.9

(51) Int. Cl.
C08G 73/12     (2006.01)
B29B 13/00    (2006.01)
(Continued)

(52) U.S. Cl.
CPC ............ C08G 73/128 (2013.01); B29B 13/00 (2013.01); B29C 41/26 (2013.01); B29C 41/44 (2013.01);
(Continued)

(58) Field of Classification Search
CPC .............. C08G 73/128; C08G 73/1085; C08G 73/1071; C08G 73/1067; C08G 73/1014;
(Continued)

(56) References Cited

U.S. PATENT DOCUMENTS

2010/0055365 A1*  3/2010  Nakajima ............. B29C 41/085
                                                            428/36.9
2020/0032064 A1*  1/2020  Kawahara .............. H01B 3/004

FOREIGN PATENT DOCUMENTS

CN            101560371 A   * 10/2009

OTHER PUBLICATIONS

Ma et al., "Preparation and Properties of Imidazole-containing Polyimide/Silica Hybrid Films," Chem. Res. Chin. Univ., 2014, 30(6), 1047-1050, published Dec. 2014 (Year: 2014).*

(Continued)

*Primary Examiner* — Leith S Shafi
*Assistant Examiner* — Inja Song
(74) *Attorney, Agent, or Firm* — Novoclaims Patent Services LLC; Mei Lin Wong

(57) ABSTRACT

A high temperature resistant polyimide film and its preparation method. The present invention relates to a polyimide film and its preparation method and solves the problems of honeycomb's and skin panel's core adhesive—polyimide film with insufficient heat resistance, no climbing of bonding core structure and adhesive fillet formation. The high temperature resistant polyimide film is made by polyimide solution, inorganic filler modifier and interface coupling agent by the steps of: under specific temperature and stirring (Continued)

conditions, adding inorganic filler modifier and interface coupling agent to polyimide solution, stirring to obtain the adhesive agent; filtering and degassing the adhesive agent, casting to a stainless steel drum with carrier cloth and release paper to obtain a self-supporting film; then heating and annealing to obtain the final polyimide film. The present invention is applied to high temperature resistant polyimide film and its preparation method.

6 Claims, 3 Drawing Sheets

(51) Int. Cl.

| | |
|---|---|
| B29C 41/26 | (2006.01) |
| B29C 41/44 | (2006.01) |
| C08G 73/10 | (2006.01) |
| C08J 5/18 | (2006.01) |
| C08K 3/36 | (2006.01) |
| C08K 3/38 | (2006.01) |
| C08K 7/18 | (2006.01) |
| C08K 9/06 | (2006.01) |
| C09J 11/04 | (2006.01) |
| C09J 11/06 | (2006.01) |
| C09J 179/08 | (2006.01) |
| B29K 79/00 | (2006.01) |
| B29K 509/08 | (2006.01) |

(52) U.S. Cl.
CPC ............ *C08G 73/1085* (2013.01); *C08J 5/18* (2013.01); *C08K 3/36* (2013.01); *C08K 3/38* (2013.01); *C08K 7/18* (2013.01); *C08K 9/06* (2013.01); *C09J 11/04* (2013.01); *C09J 11/06* (2013.01); *C09J 179/085* (2013.01); *B29B 2013/005* (2013.01); *B29K 2079/08* (2013.01); *B29K 2509/08* (2013.01); *C08J 2379/08* (2013.01); *C08K 2003/385* (2013.01); *C08K 2201/003* (2013.01)

(58) Field of Classification Search
CPC ... B29B 13/00; B29B 2013/005; B29C 41/26; B29C 41/44; C08J 5/18; C08J 2379/08; C08K 3/36; C08K 3/38; C08K 7/18; C08K 9/06; C08K 2003/385; C08K 2201/003; C08K 5/544; C08K 2003/2224; C08K 2003/2255; C08K 2003/282; C08K 2003/2227; C08K 3/14; C08K 3/22; C08K 3/28; C09J 11/04; C09J 11/06; C09J 179/085; B29K 2079/08; B29K 2509/08; C09D 179/08; C08L 79/08
See application file for complete search history.

(56) References Cited

OTHER PUBLICATIONS

English translation of CN-101560371-A, by EPO (Year: 2009).*

* cited by examiner

HEAT RESISTANT POLYIMIDE FILM AND PREPARATION METHOD THEREOF

BACKGROUND OF THE PRESENT INVENTION

Field of Invention

The present invention relates to polyimide film and its preparation method thereof.

Description of Related Arts

With the technological development of research and application in aviation and aerospace industries, the Mach number of high-speed aircraft has increased year by year, requiring a lightweight structure of honeycomb-wall panel (panel-core) sandwich structure at 300° C. and above, especially at 400° C.~500° C. with relatively good mechanical properties and thermal stability. The use of aluminum honeycomb, NOMEX honeycomb, KEVLAR honeycomb and etc. fails to meet the honeycomb temperature requirements of above 300° C. The use of polyimide honeycomb (such as HRH327 from HEXCEL corporation) and titanium alloy honeycomb can meet the temperature resistance requirements of honeycomb, and the weight loss effect of titanium alloy honeycomb is not as good as polyimide honeycomb while the polyimide honeycomb requires lower curing pressure in the curing process. This type of material is in urgent need in the manufacture of aerospace equipment. In the manufacturing process of honeycomb sandwich structure, the quality of the panel and its bonding strength with the honeycomb core are the key factors affecting the performance of the sandwich structure. Therefore, the selection of bonding adhesive is crucial.

In general, the adhesive can be classified into different forms such as a solution, a paste, and a film. Among them, the core film has the advantages of uniform thickness, accurate glue dosage, simple construction process, and applicable for use in large-area bonding, and is the first choice for bonding honeycomb sandwich structure. Among the existing high temperature resistant adhesive films, the modified epoxy film, the cyanate film and the double horse film are widely used, but the use temperature generally does not exceed 300° C. As the use temperature of the structure increases, higher, the heat resistance requirements of the film increases. In order to achieve a higher temperature resistance grading, the polyimide core film with superior heat resistance and high temperature bonding properties becomes an inevitable choice. However, adhesives for bonding lightweight and high-strength polyimide honeycomb and composite panels need to meet the following additional requirements:

First, it is necessary to meet the low pressure curing of the honeycomb (≤0.5 MPa) to avoid honeycomb cell collapse caused by high pressure curing, which in turn affecting the structural quality. This requires a polyimide film with better melt flow and lower melt viscosity under high temperature condition;

Second, after the honeycomb-core structure is cured, the adhesive needs to have a certain degree of climbing ability at the bottom end of the honeycomb in order to have a relatively higher core peel strength to meet the process requirements. The above phenomenon can be achieved by capillary action, melt flowability and thixotropy. The polyimide adhesive cured with honeycomb-skin needs to be able to realize the film-forming property of the core film and the formation of the fillet has a great contribution to the stability of the core structure.

Third, the core film needs to meet the temperature resistance requirements of honeycomb and composite materials, that is, the use requirements of above 300° C., and especially 400° C.~500° C. That is, high shear strength, flatwise tensile strength and peel strength requirements at high temperatures.

The existing polyimide adhesives are classified into two types, which are polycondensation type and addition type. The LARC-TPI developed by the Langley Research Center of NASA in the United States in 1980 is a typical polycondensation polyimide film (Polym. Inter, 1996; 41: 193-207). Its Tg is about 260° C., it has no weight loss phenomenon before 400° C. after treatment at 300 C in air, and it has good thermal oxidative stability. After curing, the shear strength of the bonded titanium alloy at room temperature was 36.5 MPa, and remained at 13.1 MPa at 232° C. In order to further reduce the cost of raw materials, the Langley Research Center has developed a series of thermoplastic polyimide films with different structures (J. Ahes., 1988; 30: 185-198.), with a monomer structure such as p-phenylenediamine, m-phenylenediamine and diphenyl ether diamine, which also achieve good bonding properties. Progar (J. Adhes. Adhes., 1984; 4: 79-86.) et al. used BTDA and 3,3-DDS to synthesize a polyimide film $PISO_2$ containing a sulfone group structure, which has the thermoplastic of polysulfone and the thermal resistance of polyimide. Its Tg is 273° C. When bonding with titanium alloy, its shear strength at room temperature and 232° C. are 32.0 and 18.1 MPa respectively. After heat aging at 204° C. for 5000 h, its shear strength at 204° C. is still as high as 20.5 MPa. Maudgal et al. (J. Adhes. Adhes., 1984; 4: 87-90.) utilize siloxane-containing 1,3-bis(aminopropyl)tetramethyldisiloxane and 3,3-diaminobenzophenone for copolymerization with 3,3,4,4-dibenzophenonetetracarboxylic dianhydride (BTDA) together to obtain a AxBy type thermoplastic polyimide film containing siloxane structure, through which the high temperature strength of the polyimide and the low temperature properties of the siloxane are organically combined. In recent years, LaRC-CPI (Aurum PIXA) (Science of Advanced Materials and Process Engineering Series, 1977, 22: 221) has stronger bonding strength for titanium alloy bonding at room temperature and high temperature due to the use of more ketone carbonyl and ether linkage monomers, reaching 49.1 MPa and 25.3 MPa (232° C.) respectively. However, the Tg value of the above film does not exceed 300° C., and it is difficult for the use temperature to exceed 300° C.

The additional type polyimide adhesive is formed by dissolving the imide prepolymer in an organic solvent such as DMAc or DMF as an adhesive through controlling the molar ratio and blocking agent of feeding materials, and then processing heating and cross-linking curing, and are mainly for bonding at short time period and high temperature resistance conditions. Moreover, since no volatile substances is released during curing, it is suitable for large-area bonding. Since highly crosslinked structure is formed after curing, the addition type polyimide adhesive has excellent heat resistance. However, the toughness of the cured product is poor and it is difficult for use to prepare a film with high toughness requirements. Currently, the common thermosetting polyimides include: (1) NA anhydride (5-norbornene-2,3-dicarboxylic anhydride) end-capped PMR type polyimide; (2) alkynyl terminated polyimide.

The PMR type polyimide is capped with norbornene, the low viscosity of the polyamic acid is formed by using the tetracarboxylic acid diester so that the content is controlled to 50% or more. Cytec's FM35 design has a molecular weight of 1500 g/mol, a cure temperature of 329° C., a cure pressure of 0.35 MPa, and a postcure at 343° C. The Ti/Ti shear strength was 17.2 MPa (25° C.), 13.8 MPa (288° C.) (12th Nat. SAMPE Tech. Con. f, 1980: 746-758). However, after the PMR-type polyimide is subjected to thermal oxidative aging at 316° C. for 125 h, the shear strength is lowered rapidly. This is due to the poor long-term thermal oxidative stability of the aliphatic norbornene group, so it does not meet the long-term bonding requirements of more than 300° C. (or even 400° C. to 500° C.).

The alkynyl-terminated polyimide has two types of curing, which are acetylene-based polyimide curing (cured at 250° C.) and phenylethynyl-based polyimide curing (cured at 370° C.). Compared with anhydride-terminated polyimide, its long-term thermal oxidative stability is better. In 1974, Hughes Aircraft Corporation of the United States introduced HR-600 acetylene-terminated polyimide (Thermid 600), which produced a cured product with a Tg of up to 350° C. and a thermal decomposition temperature of over 500° C. However, the processing window is narrow due to its high melting point and the immediate initiation of polymerization after melting. For example, ThermidMC-600 has a gel time of only 3 min at 190° C., so this series of resins as an adhesive does not form a good wetting effect on the surface to be bonded (4th Nat. SAMPE Tech. Con. f. 1982: 236-242).

Since ethynyl-terminated polyimides generally have the disadvantage of narrow processing window, phenylethynyl-terminated polyimide prepolymers were developed in the 1980s. Compared with ethynyl groups, phenylethynyl-terminated prepolymers have better chemical stability and thermal stability, and their imide prepolymers have better fluidity and a wider processing window. Since the melting time of the resin before the reaction is long, the wettability of the adherend is increased. PETI-5 (molecular weight: 5000 g/mol) has the best shear strength (52 MPa, 25° C.; 34 MPa, 177° C.) (Polym. Prep. 1994, 35: 553). However, the above polycondensation type and addition type polyimide adhesives generally have the following problems in the application of a core structure (composite-honeycomb sandwich structure):

First, in order to meet the low pressure curing of honeycomb (≤0.5 MPa), a structure that can be thermally melted is required. If it is a polycondensation type polyimide, it is thermoformed at 400° C. or below (Tm (melting point) or Tg (glass transition temperature) <400° C.), and the use temperature does not exceed 400° C. As reported in the above literatures, the use temperature is not more than 400° C. The use of addition type polyimide can meet low processing viscosity, which results in small molecular weight and great brittleness of cured material. For the core structure, this will cause the structural member to face the problem of subsequent damages such as cutting, bending and the like. At the same time, in conventional addition type polyimide film, nothing in the reports and literatures can satisfy the Tg value above 400° C., the use temperature above 400° C., and the bonding requirements of the core sandwich structure.

After the honeycomb-core structure is cured, the adhesive needs to have a certain degree of climbing ability at the bottom end of the honeycomb in order to have a relatively higher core peel strength to meet the process requirements. The above phenomenon can be achieved by capillary action, melt flowability and thixotropy. The polyimide adhesive cured with honeycomb-skin needs to be able to realize the film-forming property of the core film and the formation of the fillet has a great contribution to the stability of the core structure. However, in general, the formation of a climbable fillet requires the adhesive to have a suitable viscosity and bonding ability. Reports or disclosures in relation to the control of the climbing ability and the fillet in the core film to obtain a good bonding effect is not found.

The existing data and literature reports focus on the structural design of the addition type and polycondensation type polyimides, and very few reports focus on the shear strength, flatwise tensile strength and peel strength at high temperatures of the adhesive used in the structure. No reports on plate-core bonded polyimide film with high temperature resistance (400° C. to 500° C.) can be found. There is also no data report on how to meet the high temperature resistance, high bond toughness and interface bonding effect at the same time.

SUMMARY OF THE PRESENT INVENTION

An object of the present invention is to solve the existing problems of core adhesive in honeycomb and skin panels—polyimide film, which has insufficient thermal resistance, and no climbing and formation of adhesive fillet in core structure bonding, and to provide a high temperature resistant polyimide film and its method of manufacture thereof.

A high temperature resistant polyimide film, which is manufactured by: 100 parts by weight of polyimide solution; 10 parts to 40 parts by weight of inorganic filler modifier; and 0.1 parts by weight~5 parts interface coupling agent, wherein the inorganic filler modifier consists of silicon dioxide (silica)-based substance and substance for increasing interface bonding, and the mass ratio of the silica-based substance and the substance for increasing interface bonding is 1:(0.1~0.5), the silica-based substance is hollow ceramic microspheres, fumed silica (silicon dioxide in gaseous state), fused silica (melted silicon dioxide) or amorphous silica;

the substance for increasing interface bonding is one or a mixture of two of: aluminum hydroxide, magnesium hydroxide, molybdenum oxide, aluminum nitride, aluminum oxide, boron nitride and silicon carbide;

the polyimide solution comprises polyimide which has a structural formula of:

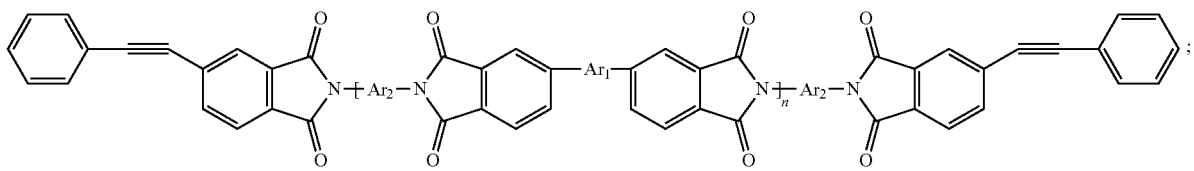

where n is 1~19;

wherein $Ar_1$ has a structural formula of:

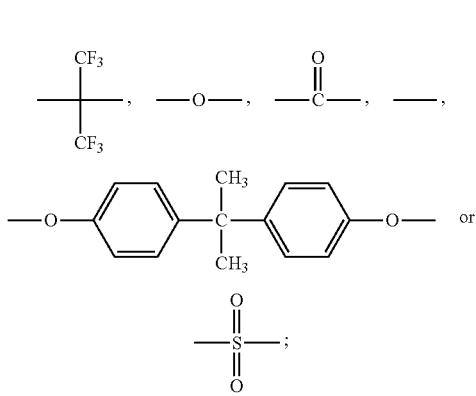

wherein $Ar_2$ has a structural formula of:

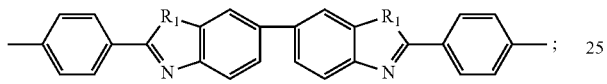

where $R_1$ is O or NH.

A method of preparing high temperature resistant polyimide film, which comprises the following steps:

(1) weighing to obtain 100 parts of polyimide solution, 10 parts to 40 parts of inorganic filler modifier and 0.1 part to 5 parts of interface coupling agent; adding 10 to 40 parts of inorganic filler modifier and 0.1 part to 5 parts of interface coupling agent to 100 parts of polyimide solution under a temperature of 90° C. to 120° C. and stirring conditions; and stirring for 10 minutes to 30 minutes to obtain an adhesive agent;

wherein the polyimide solution is manufactured by a process comprising the steps of: adding N,N-dimethylacetamide in a three-neck flask; adding aromatic diamine to the N,N-dimethylacetamide under a nitrogen atmosphere and stirring for 1 hour to 5 hours; then adding aromatic dianhydride to the three-neck flask and stirring for 1 hour to 5 hours to obtain a mixed solution; adding 4-phenylethynylphthalic anhydride to the mixed solution, stirring and allowing reaction for 1 hour to 5 hours; then adding toluene, heating to a temperature of 120° C. to 130° C. and carrying out reflux reaction for 5 hours to 20 hours under a temperature condition of 120° C.~130° C. to obtain the polyimide solution;

wherein a molar ratio of aromatic dianhydride to aromatic diamine is (0.50~0.95):1; a mass ratio of N,N-dimethylacetamide to toluene is 1:(0.2~0.5); a molar ratio of aromatic diamine to 4-phenylethynylphthalic anhydride is 1:(0.01~1); and a total number of moles of anhydride functional group in the aromatic dianhydride and 4-phenylethynyl phthalic anhydride is equal to the number of moles of amino functional group of the aromatic diamine;

a ratio of a total mass of the N,N-dimethylacetamide and the toluene to a total mass of the 4-phenylethynylphthalic anhydride, the aromatic dianhydride and the aromatic diamine is (2.5~4):1;

the aromatic anhydride is:

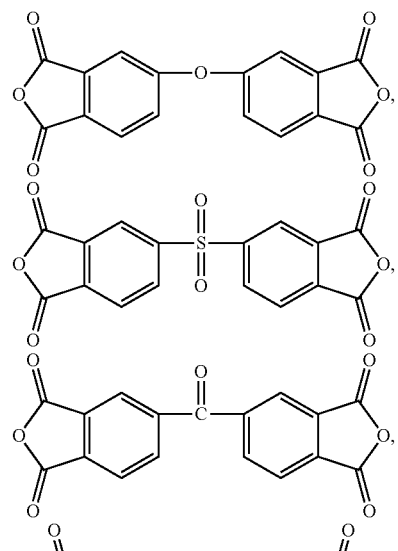

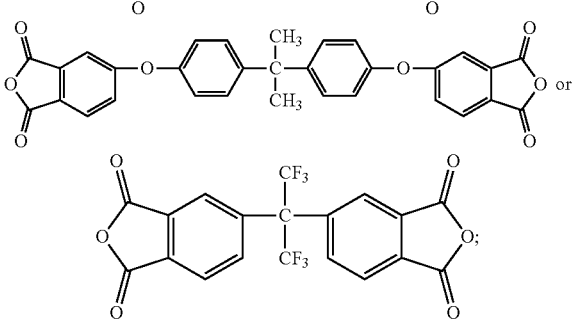

the aromatic diamine has a structural formula of:

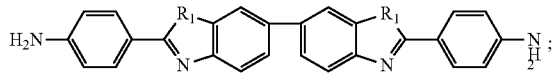

where $R_1$ is O or NH;

(2) filtering and degassing the adhesive agent, casting to a rotating drum made of stainless steel and loaded with carrier cloth and release paper to obtain a self-supporting film; then under a temperature of 60° C. to 150° C., heating for 1 min to 60 min, then under a temperature of 150° C. to 300° C., heating for 1 min to 60 min, and finally under a temperature of 50° C. to 140° C., annealing for 1 min to 20 min to obtain high temperature resistant polyimide film;

wherein the high temperature resistant polyimide film has a thickness of 0.30 mm~0.60 mm;

in the step (1), the inorganic filler modifier consists of silicon dioxide (silica)-based substance and substance for increasing interface bonding, and the mass ratio of the silica-based substance and the substance for increasing interface bonding is 1:(0.1~0.5), the silica-based substance is hollow ceramic microspheres, fumed silica (silicon dioxide in gaseous state), fused silica (melted silicon dioxide) or amorphous silica, the substance for increasing interface bonding is one or a mixture of two or more selected from the group consisting of: aluminum hydroxide, magnesium hydroxide, molybdenum oxide, aluminum nitride, aluminum oxide, boron nitride and silicon carbide;

in the step (1), the polyimide solution comprises polyimide which has a structural formula of:

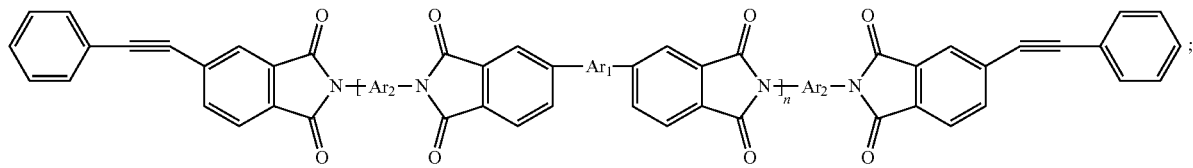
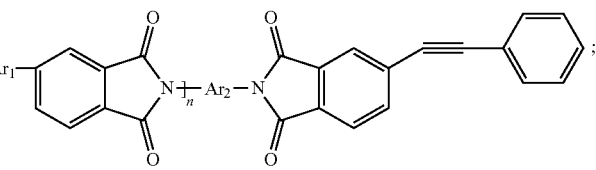

where n is 1~19;
where $Ar_1$ has a structural formula of:

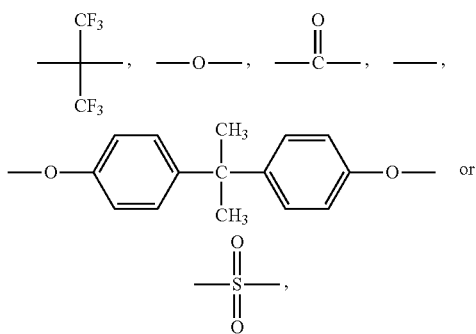

where $Ar_2$ has a structural formula of:

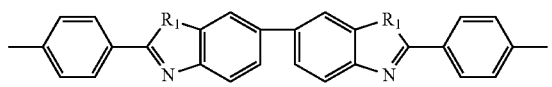

where $R_1$ is O or NH.

The present invention has the following advantageous effects:

The conventional core (honeycomb-composite materials) structure with polyimide film fails to meet the temperature resistance requirements of 300° C. or above, and especially of 400° C.~500° C., and therefore fails to meet the interface bonding requirements of new structure. At the same time, less reports are focused on climbing ability (fillet) formation, the shear strength, flatwise tensile strength and peel strength at high and low temperatures, which are required for high toughness, of the conventional polyimide film.

The present invention employs an aromatic diamine containing a nitrogen heterocyclic structure and polymerizes with an aromatic dianhydride to form a polyimide, which has a higher material modulus and rigidity when compared with biamine with an ordinary benzene ring structure as in the information and the literature. Also, the introduction of the benzimidazole or benzoxazole structure forms another coplanar rod-like structure other than the benzimidazole ring, which improves the glass transition temperature and heat resistance. Unexpectedly, above Tg value, due to the retention of the rigid structure, it still has a very high modulus value, and the modulus drops is within a 0.5 order of magnitude, so it has a performance of more than Tg, so that it can satisfy the use requirements of 400° C.~500° C. In addition, the introduction of a flexible group in the aromatic diamine is avoided so that it is ensured that each repeating unit from the imide ring to the benzimidazole and to the imide ring has a rigid linear structure to form a rigid segment, which further improve the strength performance at high temperature of the overall structure. In addition, the use of a diamine with a symmetrical structure can further enhance the structural order of the material and obtain better high temperature strength.

Second, the following aromatic dianhydride groups:

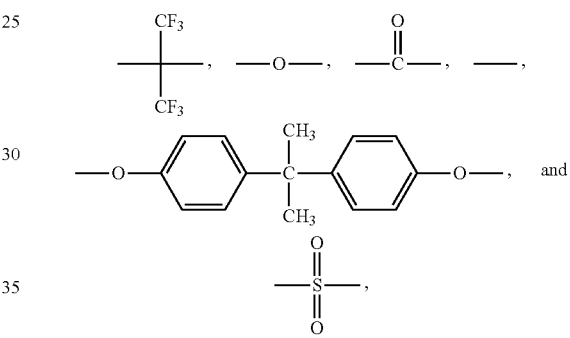

which contain a rotatable angle or steric hindranceare, are selected, and rigid coplanar structures including pyromellitic dianhydride are not used. Therefore, on the one hand, it can improve the flexibility of the segment and provide a certain degree of melt processibility through controlling the molecular weight by adjusting the number of repeating units; on the other hand, by introducing C=O, S=O, CF, and etc., which can form chemical bonding with surface groups of heterogeneous materials such as hydroxyl groups, carboxyl groups, etc., the interface bonding performance is increased, the shear strength and toughness is improved, and especially the heat resistance is improved while the peel strength is increased significantly.

It is difficult to obtain good film-forming property by using thermosetting resin alone. The carrier cloth is proposed to achieve self-supporting property of the film being formed. In addition, the use of non-polar filler can better achieve film forming toughness and high surface quality, reduce crack generation and improve product thickness uniformity. Among which, through experiments, it is found that a better effect is obtained by using silica-based materials.

It is difficult to form a good interfacial bonding effect by the thermal melting behavior of the thermosetting polyimide resin alone: a resin with a low melt viscosity, which has a good fluidity, has no climbing ability at the bottom end of the honeycomb, and cannot providing a bonding effect; a resin with high melt viscosity, which has poor fluidity, cannot form a capillary phenomenon at the bottom end of the honeycomb, and cannot providing a bonding effect.

The present invention employs a flow control agent to control the thixotropic and capillary climbing effects of the resin, thereby forming a desired fillet and obtaining a good bonding effect. Unexpectedly, the use of a mixture of thixotropy-controlling silica substances for and an substance for increasing interface bonding such as oxides, carbides, nitrides can improve the fluidity of the resin melt while the climbing resistance is suppressed, thus resulting the retention of fillet effect after curing as well as a better peel toughness. When the mass ratio of the silica-based substance and the substance for increasing interface bonding is 1:(0.1~0.5), the best overall effect is obtained. Moreover, when the mass ratio of the added inorganic filler modifier to the polyimide solution is (0.1 to 0.4):1, a good core-structure bonding effect is obtained, which is mainly reflected by proper climbing ability and fillet formation, that excessive filler will affect the resin melt flow and capillary climbing action at the bottom end of the honeycomb and inadequate filler will lead to failure to control thixotropy.

The formula of the invention is reasonable, and the prepared film has the thermal resistance above 300° C., and especially has the thermal resistance and the bonding ability of the core structure at 400° C.~500° C., and an excellent interface bonding effect can be obtained. It can be used for bonding polyimide honeycomb, titanium alloy honeycomb and polyimide composite materials, titanium alloy and stainless steel structural parts, which requires relatively higher thermal performance, thus broadening the applications of adhesives with high temperature resistant in aerospace and aviation industries.

The present invention is applied to a high temperature resistant polyimide film and its manufacturing method thereof.

DETAILED DESCRIPTION OF THE PREFERRED EMBODIMENT

Preferred Embodiment 1

Figure 1:
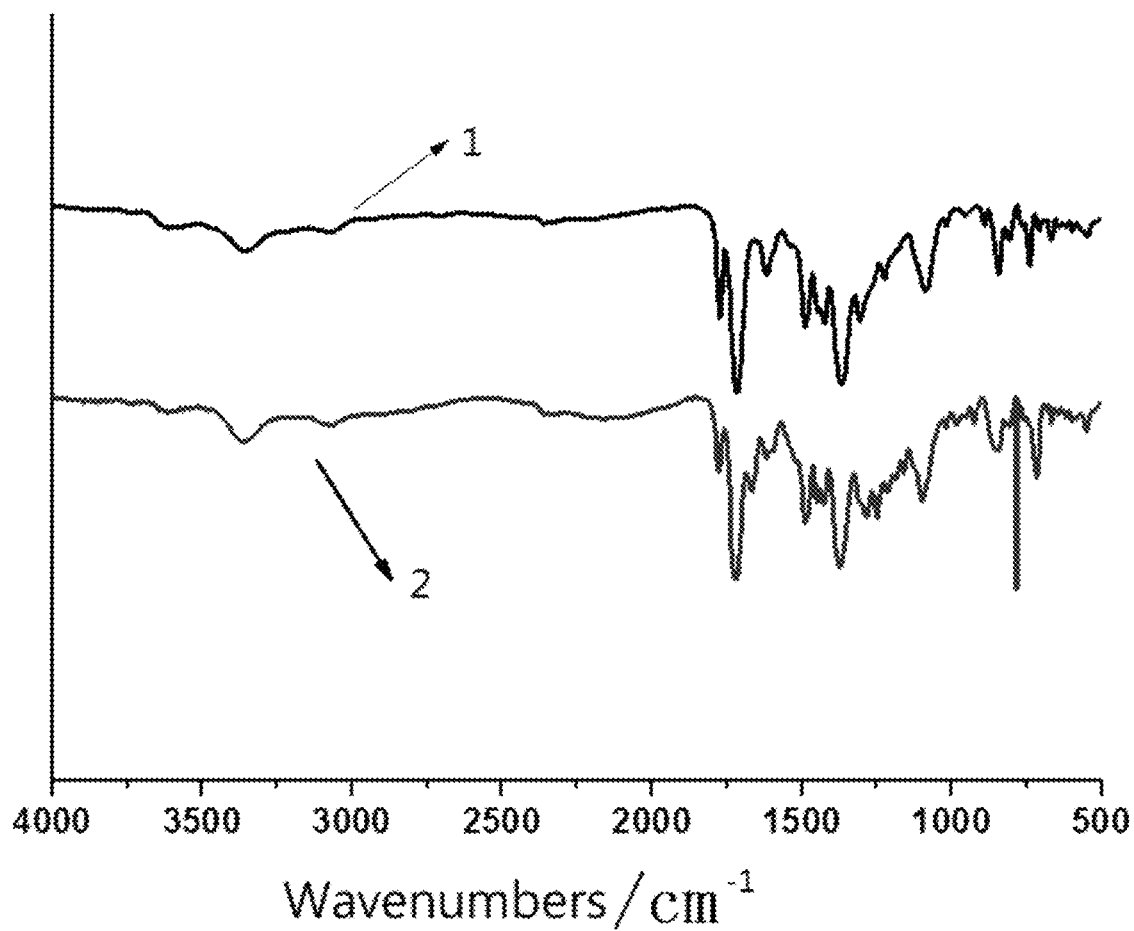
FIG. 1 is an infrared spectrum, 1 is an infrared curve after curing of the polyimide solution prepared in synthesis embodiment 1; and 2 is an infrared curve after curing of the polyimide solution prepared in synthesis embodiment 3.

According to this embodiment, a high temperature resistant polyimide film is manufactured by: 100 parts by weight of polyimide solution; 10 parts to 40 parts by weight of inorganic filler modifier; and 0.1 parts~5 parts by weight of interface coupling agent, wherein the inorganic filler modifier consists of silicon dioxide (silica)-based substance and substance for increasing interface bonding, and the mass ratio of the silica-based substance and the substance for increasing interface bonding is 1:(0.1~0.5), the silica-based substance is hollow ceramic microspheres, fumed silica (silicon dioxide in gaseous state), fused silica (melted silicon dioxide) or amorphous silica;

the substance for increasing interface bonding is one or a mixture of two or more of: aluminum hydroxide, magnesium hydroxide, molybdenum oxide, aluminum nitride, aluminum oxide, boron nitride and silicon carbide;

the polyimide solution comprises polyimide which has a structural formula of:

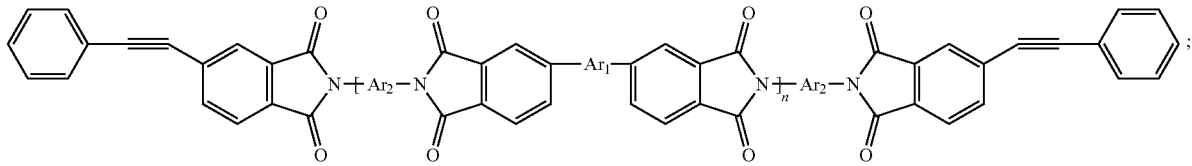

where n is 1~19;
wherein $Ar_1$ has a structural formula of:

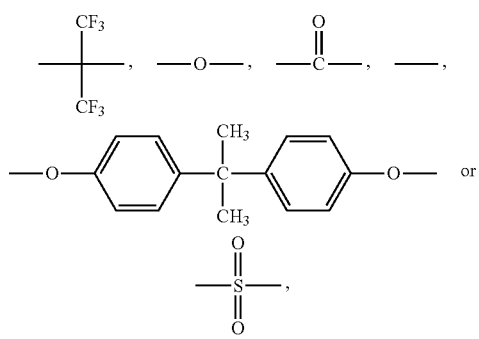

wherein $Ar_2$ has a structural formula of:

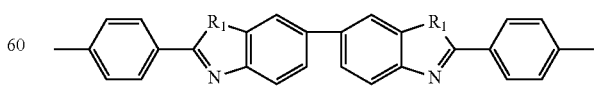

where $R_1$ is O or NH.

The structural formula of the polyimide in the polyimide solution contains a nitrogen heterocyclic structure. Preferably, the nitrogen heterocyclic structure is bonded to the diamine structure and contains a reactive end group, which is terminated with 4-phenylethynyl phthalic anhydride.

The silica-based substance can control thixotropic flow properties.

The advantageous effect of this preferred embodiment is as follows: The conventional core (honeycomb-composite materials) structure with polyimide film fails to meet the temperature resistance requirements above 300° C., and especially of 400° C.~500° C., and therefore fails to meet the interface bonding requirements of new structure. At the same time, less reports are focused on climbing ability (fillet) formation, the shear strength, flatwise tensile strength and peel strength at high and low temperatures, which are required for high toughness, of the conventional polyimide film.

The present invention employs an aromatic diamine containing a nitrogen heterocyclic structure and polymerizes with an aromatic dianhydride to form a polyimide, which has a higher material modulus and rigidity when compared with biamine with an ordinary benzene ring structure as in the information and the literature. Also, the introduction of the benzimidazole or benzoxazole structure forms another coplanar rod-like structure other than the benzimidazole ring, which improves the glass transition temperature and heat resistance. Unexpectedly, above Tg value, due to the retention of the rigid structure, it still has a very high modulus value, and the modulus drops is within a 0.5 order of magnitude, so it has a performance of more than Tg, so that it can satisfy the use requirements of 400° C.~500° C. In addition, the introduction of a flexible group in the aromatic diamine is avoided so that it is ensured that each repeating unit from the imide ring to the benzimidazole and to the imide ring has a rigid linear structure to form a rigid segment, which further improve the strength performance at high temperature of the overall structure. In addition, the use of a diamine with a symmetrical structure can further enhance the structural order of the material and obtain better high temperature strength.

Second, in this embodiment, the following aromatic dianhydride groups:

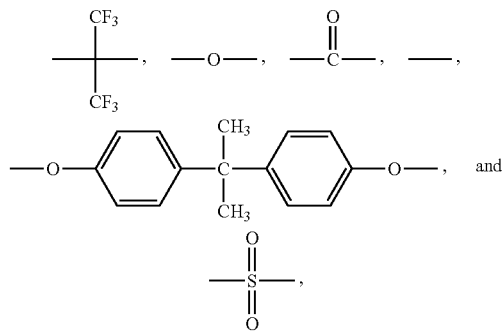

which contain a rotatable angle or steric hindrance are, are selected, and rigid coplanar structures including pyromellitic dianhydride are not used. Therefore, on the one hand, it can improve the flexibility of the segment and provide a certain degree of melt processability through controlling the molecular weight by adjusting the number of repeating units; on the other hand, by introducing C=O, S=O, CF, and etc., which can form chemical bonding with surface groups of heterogeneous materials such as hydroxyl groups, carboxyl groups, etc., the interface bonding performance is increased, the shear strength and toughness is improved, and especially the heat resistance is improved while the peel strength is increased significantly.

It is difficult to obtain good film-forming property by using thermosetting resin alone. The carrier cloth is proposed to achieve self-supporting property of the film being formed. In addition, the use of non-polar filler can better achieve film forming toughness and high surface quality, reduce crack generation and improve product thickness uniformity. Among which, through experiments, it is found that a better effect is obtained by using silica-based materials.

It is difficult to form a good interfacial bonding effect by the thermal melting behavior of the thermosetting polyimide resin alone: a resin with a low melt viscosity, which has a good fluidity, has no climbing ability at the bottom end of the honeycomb, and cannot providing a bonding effect; a resin with high melt viscosity, which has poor fluidity, cannot form a capillary phenomenon at the bottom end of the honeycomb, and cannot providing a bonding effect.

The present invention employs a flow control agent to control the thixotropic and capillary climbing effects of the resin, thereby forming a desired fillet and obtaining a good bonding effect. Unexpectedly, the use of a mixture of thixotropy-controlling silica substances for and an substance for increasing interface bonding such as oxides, carbides, nitrides can improve the fluidity of the resin melt while the climbing resistance is suppressed, thus resulting the retention of fillet effect after curing as well as a better peel toughness. When the mass ratio of the silica-based substance and the substance for increasing interface bonding is 1:(0.1~0.5), the best overall effect is obtained. Moreover, when the mass ratio of the added inorganic filler modifier to the polyimide solution is (0.1 to 0.4):1, a good core-structure bonding effect is obtained, which is mainly reflected by proper climbing ability and fillet formation, that excessive filler will affect the resin melt flow and capillary climbing action at the bottom end of the honeycomb and inadequate filler will lead to failure to control thixotropy.

The formula of the invention is reasonable, and the prepared film has the thermal resistance above 300° C., and especially has the thermal resistance and the bonding ability of the core structure at 400° C.~500° C., and an excellent interface bonding effect can be obtained. It can be used for bonding polyimide honeycomb, titanium alloy honeycomb and polyimide composite materials, titanium alloy and stainless steel structural parts, which requires relatively higher thermal performance, thus broadening the applications of adhesives with high temperature resistant in aerospace and aviation industries.

Preferred Embodiment 2

This embodiment differs from Embodiment 1 in that the polyimide solution is prepared according to the following steps:

adding N,N-dimethylacetamide in a three-neck flask; adding aromatic diamine to the N,N-dimethylacetamide under a nitrogen atmosphere and stirring for 1 hour to 5 hours; then adding aromatic dianhydride to the three-neck flask and stirring for 1 hour to 5 hours to obtain a mixed solution; adding 4-phenylethynylphthalic anhydride to the mixed solution, stirring and allowing reaction for 1 hour to 5 hours; then adding toluene, heating to a temperature of 120° C. to 130° C. and carrying out reflux reaction for 5 hours to 20 hours under a temperature condition of 120° C.~130° C. to obtain the polyimide solution;

wherein a molar ratio of aromatic dianhydride to aromatic diamine is (0.50~0.95):1; a mass ratio of N,N-dimethylacetamide to toluene is 1:(0.2~0.5); a molar ratio of aromatic diamine to 4-phenylethynylphthalic anhydride is 1:(0.01~1); and a total number of moles of anhydride functional group in the aromatic dianhydride and 4-phenylethynyl phthalic anhydride is equal to the number of moles of amino functional group of the aromatic diamine;

a ratio of a total mass of the N,N-dimethylacetamide and the toluene to a total mass of the 4-phenylethynylphthalic anhydride, the aromatic dianhydride and the aromatic diamine is (2.5~4):1;

the aromatic anhydride is:

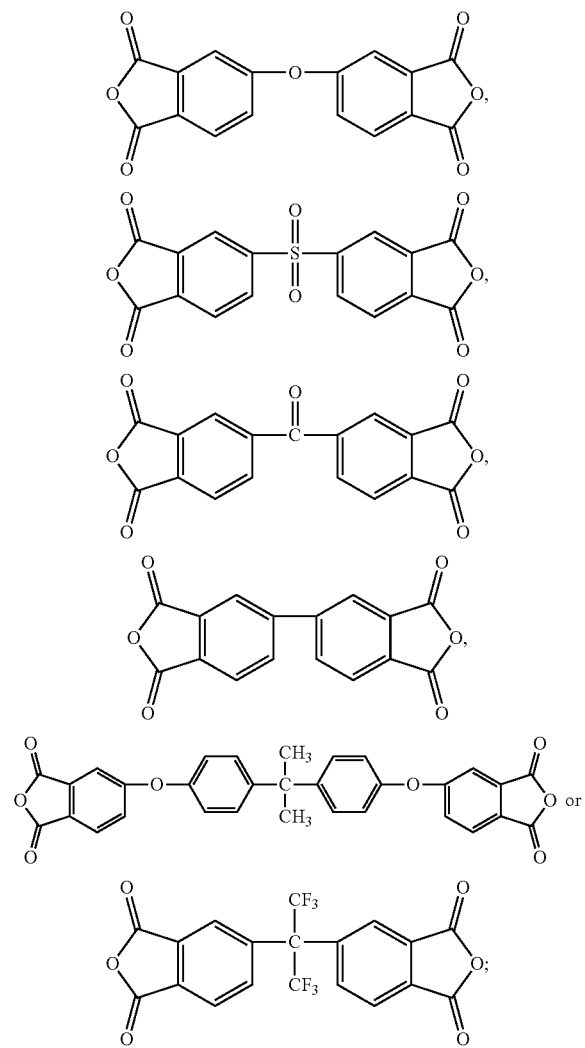

the aromatic diamine has a structural formula of:

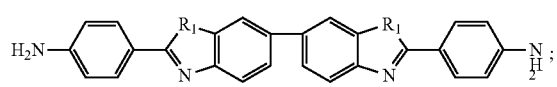

where $R_1$ is O or NH. Others are the same as in the Embodiment 1.

Preferred Embodiment 3

This embodiment differs from Embodiment 1 or Embodiment 2 in that: the inorganic filler modifier has an average particle diameter of 0.1 μm to 10 μm; the interface coupling agent is a silane coupling agent containing amino end group. Others are the same as in the Embodiment 1 or Embodiment 2.

The average particle diameter of the inorganic filler modifier needs to meet the requirement of dispersion uniformity. Preferably, the average particle diameter is 0.5 μm~3 μm.

Preferred Embodiment 4

This embodiment differs from one of the Embodiment 1 to 3 in that: the silane coupling agent containing amino end group is γ-aminopropyltriethoxysilane, 3-aminopropyltrimethoxysilane or 3-aminopropylmethyldiethoxysilane. Others are the same as in the Embodiments 1-3.

Preferred Embodiment 5

This embodiment provides a method of preparing high temperature resistant polyimide film with the following steps:

(1) weighing to obtain 100 parts of polyimide solution, 10 parts to 40 parts of inorganic filler modifier and 0.1 part to 5 parts of interface coupling agent; adding 10 to 40 parts of inorganic filler modifier and 0.1 part to 5 parts of interface coupling agent to 100 parts of polyimide solution under a temperature of 90° C. to 120° C. and stirring conditions; and stirring for 10 min-30 min to obtain an adhesive agent;

the polyimide solution is manufactured by a process comprising the following steps: adding N,N-dimethylacetamide in a three-neck flask; adding aromatic diamine to the N,N-dimethylacetamide under a nitrogen atmosphere and stirring for 1 h~5 h; then adding aromatic dianhydride to the three-neck flask and stirring for 1 h~5 h to obtain a mixed solution; adding 4-phenylethynylphthalic anhydride to the mixed solution, stirring and allowing reaction for 1 h~5 h; then adding toluene, heating to a temperature of 120° C.~130° C. and carrying out reflux reaction for 5 h~20 h under a temperature condition of 120° C.~130° C. to obtain the polyimide solution;

wherein a molar ratio of aromatic dianhydride to aromatic diamine is (0.50~0.95):1; a mass ratio of N,N-dimethylacetamide to toluene is 1:(0.2~0.5); a molar ratio of aromatic diamine to 4-phenylethynylphthalic anhydride is 1:(0.01~1); and a total number of moles of anhydride functional group in the aromatic dianhydride and 4-phenylethynyl phthalic anhydride is equal to the number of moles of amino functional group of the aromatic diamine;

a ratio of a total mass of the N,N-dimethylacetamide and the toluene to a total mass of the 4-phenylethynylphthalic anhydride, the aromatic dianhydride and the aromatic diamine is (2.5~4):1;

the aromatic anhydride is:

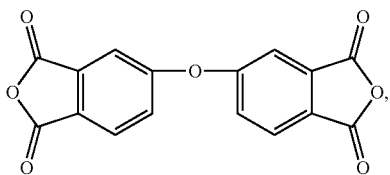

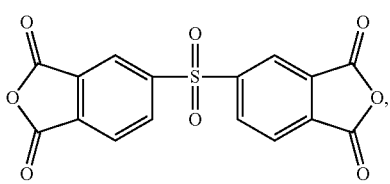

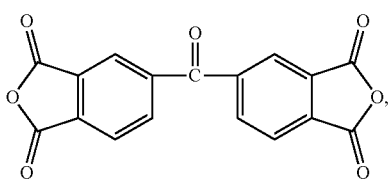

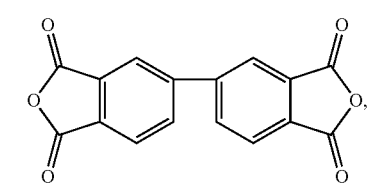

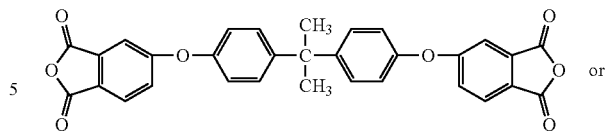

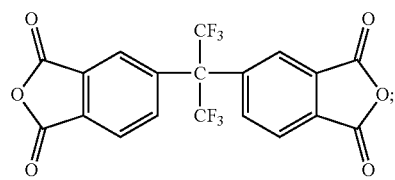

the aromatic diamine has a structural formula of:

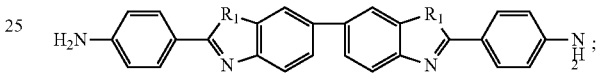

where $R_1$ is O or NH;

(2) filtering and degassing the adhesive agent, casting to a rotating drum made of stainless steel and loaded with carrier cloth and release paper to obtain a self-supporting film; then under a temperature of 60° C.~150° C., heating for 1 min~60 min, then under a temperature of 150° C.~300° C., heating for 1 min~60 min, and finally under a temperature of 50° C.~140° C., annealing for 1 min~20 min to obtain high temperature resistant polyimide film;

the high temperature resistant polyimide film has a thickness of 0.30 mm~0.60 mm;

in the step (1), the inorganic filler modifier consists of silicon dioxide (silica)-based substance and substance for increasing interface bonding, and the mass ratio of the silica-based substance and the substance for increasing interface bonding is 1:(0.1~0.5);

the silica-based substance is hollow ceramic microspheres, fumed silica (silicon dioxide in gaseous state), fused silica (melted silicon dioxide) or amorphous silica;

the substance for increasing interface bonding is one or a mixture of two or more of: aluminum hydroxide, magnesium hydroxide, molybdenum oxide, aluminum nitride, aluminum oxide, boron nitride and silicon carbide;

in the step (1), the polyimide solution comprises polyimide which has a structural formula of:

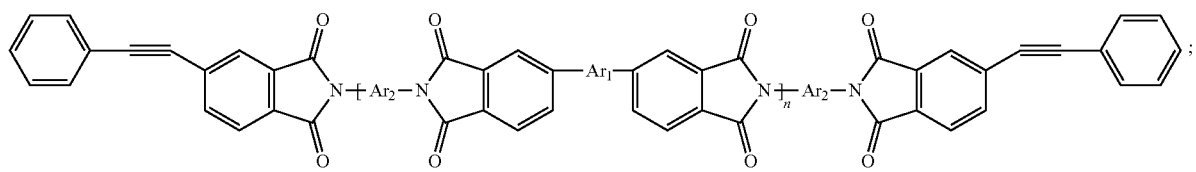

where n is 1~19;
where $Ar_1$ has a structural formula of:

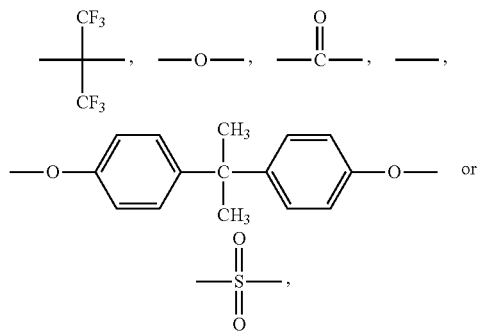

where $Ar_2$ has a structural formula of:

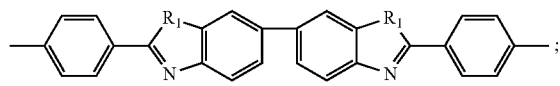

where $R_1$ is O or NH.

Preferred Embodiment 6

This embodiment differs from Embodiment 5 in that: in the step (1), the average particle diameter of the inorganic filler modifier is 0.1 μm~10 μm. Others are the same as in the Embodiment 5.

Preferred Embodiment 7

This embodiment differs from Embodiment 5 or Embodiment 6 in that: in the step (1), the interface coupling agent is a silane coupling agent containing amino end group. Others are the same as in the Embodiment 5 or Embodiment 6.

Preferred Embodiment 8

This embodiment differs from one of the Embodiment 5-7 in that: the silane coupling agent containing amino end group is γ-aminopropyltriethoxysilane, 3-aminopropyltrimethoxysilane or 3-aminopropylmethyldiethoxysilane. Others are the same as in the Embodiments 5-7.

Preferred Embodiment 9

This embodiment differs from one of the Embodiment 5-8 in that: in the step (2), the carrier cloth is: E-glass fiberglass cloth, D-glass fiberglass cloth, S-glass fiberglass cloth, NE-glass fiberglass cloth, T-glass fiberglass cloth or Q-glass fiberglass cloth. Others are the same as in the Embodiments 5-8.

The carrier cloth is a glass carrier cloth, which can be used for known materials for various printed circuit boards and composite materials. Among these substrates, it is more preferable to use E-glass fiberglass cloth which has excellent expansion coefficient in the planar direction and excellent balance in drilling process.

Preferred Embodiment 10

This embodiment differs from one of the Embodiment 5-9 in that: the carrier cloth has a surface density of 100 g/cm²~110 g/cm². Others are the same as in the Embodiments 5-9.

The following embodiments are used to verify the beneficial effects of the present invention:

Synthesis Embodiment 1

The polyimide solution is prepared according to the following steps: adding 189 g N,N-dimethylacetamide in a three-neck flask; adding 41.65 g (0.1 mol) aromatic diamine to the N,N-dimethylacetamide under a nitrogen atmosphere and stirring for 1 h; then adding 14.71 g (0.05 mol) 3,3',4,4'-biphenyltetracarboxylic dianhydride to the three-neck flask and stirring for 5 hours to obtain a mixed solution; adding 24.82 g (0.1 mol) 4-phenylethynylphthalic anhydride to the mixed solution, stirring and allowing reaction for 3 hours; then adding 62 g toluene, heating to a temperature of 130° C. and carrying out reflux reaction for 10 hours under a temperature condition of 130° C. to obtain the polyimide solution;

the 3,3',4,4'-biphenyltetracarboxylic dianhydride has a structural formula of:

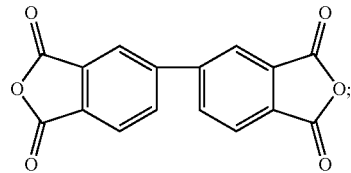 [SMILES: O=C1OC(=O)c2cc(-c3ccc4c(c3)C(=O)OC4=O)ccc21]

the aromatic diamine has a structural formula of:

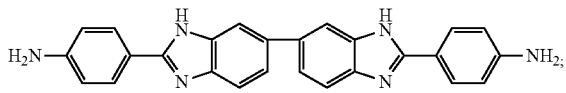

the CAS number of the aromatic diamine is: 4402-17-9;
the polyimide in the polyimide solution has a structural formula of:

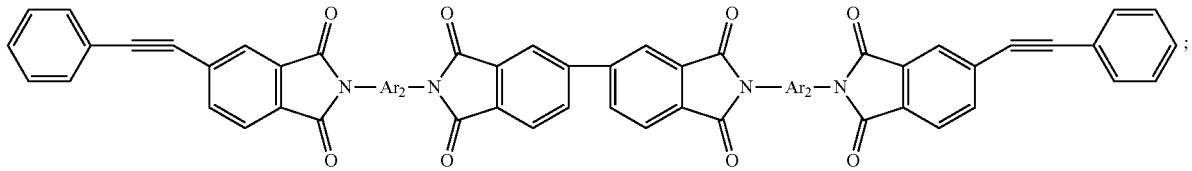

wherein Ar₂ has a structural formula of:

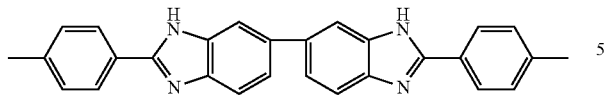

Synthesis Embodiment 2

The polyimide solution is prepared according to the following steps: adding 175 g N,N-dimethylacetamide in a three-neck flask; adding 41.65 g (0.1 mol) aromatic diamine to the N,N-dimethylacetamide under a nitrogen atmosphere and stirring for 1 h; then adding 23.54 g (0.08 mol) 3,3',4,4'-biphenyltetracarboxylic dianhydride to the three-neck flask and stirring for 5 hours to obtain a mixed solution; adding 9.93 g (0.04 mol) 4-phenylethynylphthalic anhydride to the mixed solution, stirring and allowing reaction for 3 hours; then adding 58 g toluene, heating to a temperature of 130° C. and carrying out reflux reaction for 10 hours under a temperature condition of 130° C. to obtain the polyimide solution;

the 3,3',4,4'-biphenyltetracarboxylic dianhydride has a structural formula of:

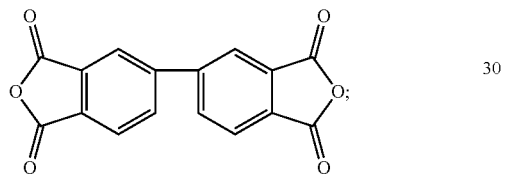

the aromatic diamine has a structural formula of:

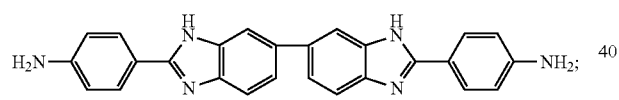

the CAS number of the aromatic diamine is: 4402-17-9;
the polyimide in the polyimide solution has a structural formula of:

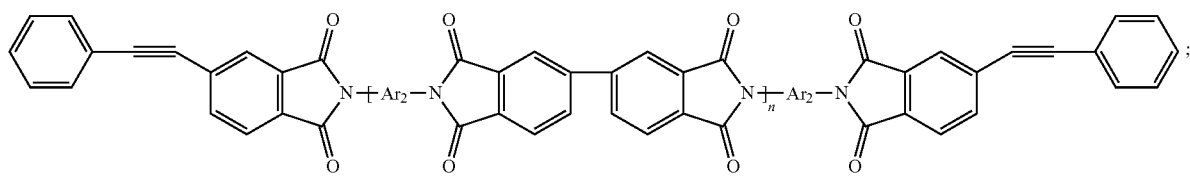

wherein Ar₂ has a structural formula of:

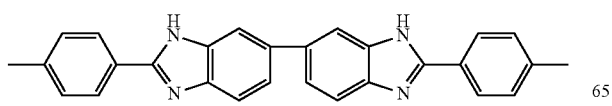

Synthesis Embodiment 3

The polyimide solution is prepared according to the following steps: adding 190 g N,N-dimethylacetamide in a three-neck flask; adding 41.65 g (0.1 mol) aromatic diamine to the N,N-dimethylacetamide under a nitrogen atmosphere and stirring for 1 h; then adding 16.11 g (0.05 mol) 3,3',4,4'-benzophenonetetracarboxylic dianhydride to the three-neck flask and stirring for 5 hours to obtain a mixed solution; adding 24.82 g (0.1 mol) 4-phenylethynylphthalic anhydride to the mixed solution, stirring and allowing reaction for 3 hours; then adding 63 g toluene, heating to a temperature of 130° C. and carrying out reflux reaction for 10 hours under a temperature condition of 130° C. to obtain the polyimide solution;

the 3,3',4,4'-benzophenonetetracarboxylic dianhydride has a structural formula of:

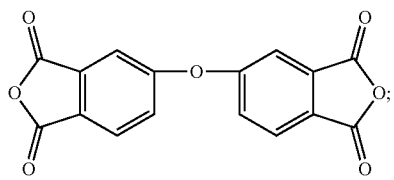 [SMILES: O=C1OC(=O)c2cc(Oc3ccc4c(c3)C(=O)OC4=O)ccc21]

the aromatic diamine has a structural formula of:

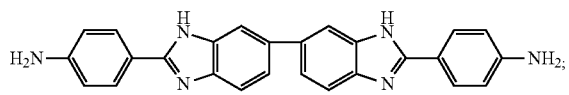 [SMILES: Nc1ccc(-c2nc3ccc(-c4ccc5nc(-c6ccc(N)cc6)[nH]c5c4)cc3[nH]2)cc1]

the CAS number of the aromatic diamine is: 4402-17-9;

the polyimide in the polyimide solution has a structural formula of:

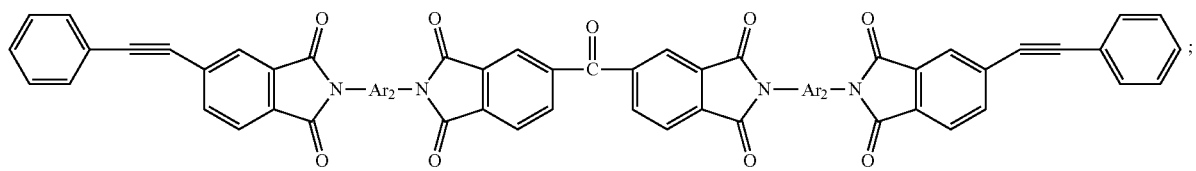

where $Ar_2$ has a structural formula of:

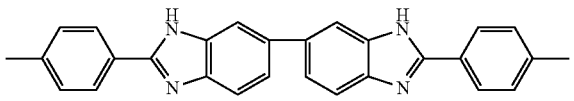

Synthesis Embodiment 4

The polyimide solution is prepared according to the following steps: adding 180 g N,N-dimethylacetamide in a three-neck flask; adding 41.65 g (0.1 mol) aromatic diamine to the N,N-dimethylacetamide under a nitrogen atmosphere and stirring for 1 h; then adding 25.78 g (0.08 mol) 3,3',4,4'-benzophenonetetracarboxylic dianhydride to the three-neck flask and stirring for 5 hours to obtain a mixed solution; adding 9.93 g (0.04 mol) 4-phenylethynylphthalic anhydride to the mixed solution, stirring and allowing reaction for 3 hours; then adding 60 g toluene, heating to a temperature of 130° C. and carrying out reflux reaction for 10 hours under a temperature condition of 130° C. to obtain the polyimide solution;

the 3,3',4,4'-benzophenonetetracarboxylic dianhydride has a structural formula of:

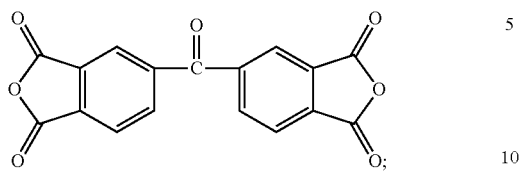

the aromatic diamine has a structural formula of:

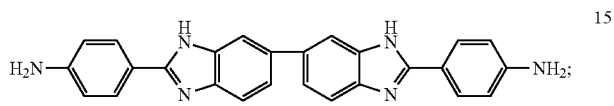

the CAS number of the aromatic diamine is: 4402-17-9;
the polyimide in the polyimide solution has a structural formula of:

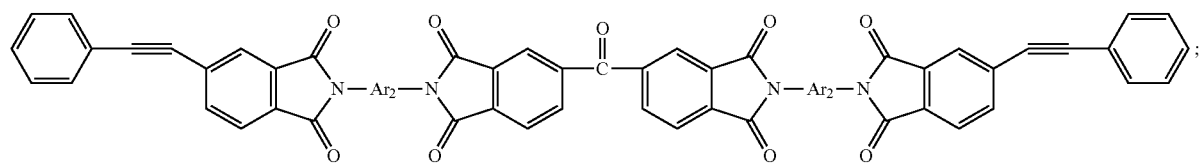

where $Ar_2$ has a structural formula of:

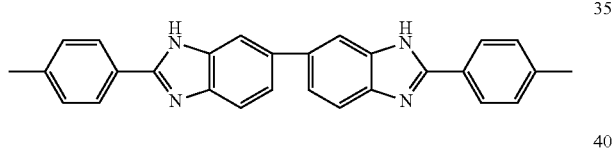

Synthesis Embodiment 5

The polyimide solution is prepared according to the following steps: adding 180 g N,N-dimethylacetamide in a three-neck flask; adding 41.65 g (0.1 mol) aromatic diamine to the N,N-dimethylacetamide under a nitrogen atmosphere and stirring for 1 h; then adding 29.00 g (0.09 mol) 3,3',4,4'-benzophenonetetracarboxylic dianhydride to the three-neck flask and stirring for 5 hours to obtain a mixed solution; adding 4.96 g (0.02 mol) 4-phenylethynylphthalic anhydride to the mixed solution, stirring and allowing reaction for 3 hours; then adding 60 g toluene, heating to a temperature of 130° C. and carrying out reflux reaction for 10 hours under a temperature condition of 130° C. to obtain the polyimide solution;
the 3,3',4,4'-benzophenonetetracarboxylic dianhydride has a structural formula of:

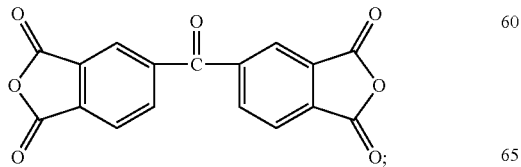

the aromatic diamine has a structural formula of:

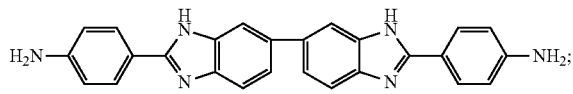 [SMILES: Nc1ccc(-c2nc3ccc(-c4ccc5nc(-c6ccc(N)cc6)[nH]c5c4)cc3[nH]2)cc1]

the CAS number of the aromatic diamine is: 4402-17-9;
the polyimide in the polyimide solution has a structural formula of:

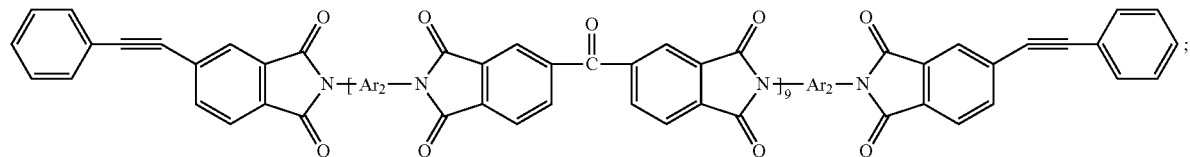

where $Ar_2$ has a structural formula of:

Embodiment 1

A polyimide film is manufactured by: 100 parts by weight of polyimide solution; 20 parts by weight of inorganic filler modifier; and 1 part by weight of interface coupling agent;

the inorganic filler modifier consists of 17 parts by weight of fumed silica (silicon dioxide in gaseous state) and 3 parts by weight of boron nitride;

the interface coupling agent is γ-aminopropyltriethoxysilane; the polyimide solution is the polyimide solution of synthesis embodiment 1;

a method of preparing polyimide film comprises the following steps:

(1) weighing to obtain 100 parts of polyimide solution, 20 parts of inorganic filler modifier and 1 part of interface coupling agent; adding 20 parts of inorganic filler modifier and 1 part of interface coupling agent to 100 parts of polyimide solution under a temperature of 90° C. and stirring conditions; and stirring for 30 min to obtain an adhesive agent;

(2) filtering and degassing the adhesive agent, casting to a rotating drum, which is made of stainless steel and loaded with carrier cloth and release paper, to obtain a self-supporting film; then under a temperature of 60° C., heating for 60 min, then under a temperature of 150° C., heating for 5 min, and finally under a temperature of 60° C., annealing for 5 min to obtain a polyimide film;

the polyimide film has a thickness of 0.40 mm; the carrier cloth is an E-glass fiberglass cloth having a surface density of 110 $g/cm^2$; the inorganic filler modifier has an average particle size of 5 μm.

Embodiment 2

This embodiment differs from Embodiment 1 in that: the polyimide solution is the polyimide solution as prepared in synthesis embodiment 2. Others are the same as in the Embodiment 1.

Embodiment 3

This embodiment differs from Embodiment 1 in that: the polyimide solution is the polyimide solution as prepared in synthesis embodiment 3. Others are the same as in the Embodiment 1.

Embodiment 4

This embodiment differs from Embodiment 1 in that: the polyimide solution is the polyimide solution as prepared in synthesis embodiment 4. Others are the same as in the Embodiment 1.

Embodiment 5

This embodiment differs from Embodiment 1 in that: the polyimide solution is the polyimide solution as prepared in synthesis embodiment 5. Others are the same as in the Embodiment 1.

Embodiment 6

A polyimide film is manufactured by: 100 parts by weight of polyimide solution; 3 parts by weight of inorganic filler modifier; and 1 part by weight of interface coupling agent;

the inorganic filler modifier consists of 2 parts by weight of fumed silica (silicon dioxide in gaseous state) and 1 part by weight of boron nitride;

the interface coupling agent is γ-aminopropyltriethoxysilane;

the polyimide solution is the polyimide solution of synthesis embodiment 1;

a method of preparing polyimide film comprises the following steps:

(1) weighing to obtain 100 parts of polyimide solution, 3 parts of inorganic filler modifier and 1 part of interface coupling agent; adding 3 parts of inorganic filler modifier and 1 part of interface coupling agent to 100 parts of polyimide solution under a temperature of 90° C. and stirring conditions; and stirring for 30 min to obtain an adhesive agent;

(2) filtering and degassing the adhesive agent, casting to a rotating drum, which is made of stainless steel and loaded with carrier cloth and release paper, to obtain a self-supporting film; then under a temperature of 60° C., heating for 60 min, then under a temperature of 150° C., heating for 5 min, and finally under a temperature of 60° C., annealing for 5 min to obtain a polyimide film;

the polyimide film has a thickness of 0.4 mm; the carrier cloth is an E-glass fiberglass cloth having a surface density of 110 $g/cm^2$; the inorganic filler modifier has an average particle size of 5 μm.

Embodiment 7

This embodiment differs from Embodiment 6 in that: the polyimide film is manufactured by: 100 parts by weight of polyimide solution; 36 parts by weight of inorganic filler modifier; and 2 parts by weight of interface coupling agent; the inorganic filler modifier consists of 30 parts by weight of fused silica (melted silicon dioxide) and 6 parts by weight of aluminum hydroxide. Others are the same as in the Embodiment 6.

Embodiment 8

This embodiment differs from Embodiment 6 in that: the polyimide film is manufactured by: 100 parts by weight of polyimide solution; 79 parts by weight of inorganic filler modifier; and 3 parts by weight of interface coupling agent; the inorganic filler modifier consists of 70 parts by weight of fused silica (melted silicon dioxide), 3 parts by weight of aluminum hydroxide, 5 parts by weight of aluminum nitride and 1 part by weight of boron nitride. Others are the same as in the Embodiment 6.

Embodiment 9

This embodiment differs from Embodiment 6 in that: the polyimide film is manufactured by: 100 parts by weight of polyimide solution; 20 parts by weight of inorganic filler modifier; and 1 part by weight of interface coupling agent; the inorganic filler modifier consists of 17 parts by weight of amorphous silica and 3 parts by weight of aluminum oxide. Others are the same as in the Embodiment 6.

Embodiment 10

This embodiment differs from Embodiment 9 in that: the polyimide solution is the polyimide solution as prepared in synthesis embodiment 3. Others are the same as in the Embodiment 9.

Embodiment 11

This embodiment differs from Embodiment 9 in that: the inorganic filler modifier consists of 17 parts by weight of fumed silica (silicon dioxide in gaseous state) and 3 parts by weight of boron nitride; the polyimide solution consists of 50 parts by weight of the polyimide solution as prepared in synthesis embodiment 1 and 50 parts by weight of the polyimide solution as prepared in synthesis embodiment 3. Others are the same as in the Embodiment 9.

Embodiment 12

This embodiment differs from Embodiment 9 in that: the inorganic filler modifier consists of 17 parts by weight of fumed silica (silicon dioxide in gaseous state) and 3 parts by weight of boron nitride; the polyimide solution consists of 50 parts by weight of the polyimide solution as prepared in synthesis embodiment 1 and 50 parts by weight of the polyimide solution as prepared in synthesis embodiment 4. Others are the same as in the Embodiment 9.

Embodiment 13

This embodiment differs from Embodiment 9 in that: the inorganic filler modifier consists of 17 parts by weight of fumed silica (silicon dioxide in gaseous state) and 3 parts by weight of boron nitride; the polyimide solution consists of 30 parts by weight of the polyimide solution as prepared in synthesis embodiment 1 and 70 parts by weight of the polyimide solution as prepared in synthesis embodiment 4. Others are the same as in the Embodiment 9.

Embodiment 14

This embodiment differs from Embodiment 9 in that: the inorganic filler modifier consists of 17 parts by weight of fumed silica (silicon dioxide in gaseous state) and 3 parts by weight of boron nitride; the polyimide solution consists of 70 parts by weight of the polyimide solution as prepared in synthesis embodiment 1 and 30 parts by weight of the polyimide solution as prepared in synthesis embodiment 4. Others are the same as in the Embodiment 9.

Embodiment 15 filtering and degassing the polyimide solution as prepared in synthesis embodiment 1, casting to a rotating drum, which is made of stainless steel and loaded with carrier cloth and release paper, to obtain a self-supporting film; then under a temperature of 60° C., heating for 60 min, then under a temperature of 150° C., heating for 5 min, and finally under a temperature of 60° C., annealing for 5 min to obtain a polyimide film;

the carrier cloth is an E-glass fiberglass cloth having a surface density of 110 g/cm².

Embodiment 16

This embodiment differs from Embodiment 15 in that: the polyimide solution is the polyimide solution as prepared in synthesis embodiment 2. Others are the same as in the Embodiment 15.

Embodiment 17

This embodiment differs from Embodiment 15 in that: the polyimide solution is the polyimide solution as prepared in synthesis embodiment 3. Others are the same as in the Embodiment 15.

Embodiment 18

This embodiment differs from Embodiment 15 in that: the polyimide solution is the polyimide solution as prepared in synthesis embodiment 4. Others are the same as in the Embodiment 15.

Embodiment 19

This embodiment differs from Embodiment 15 in that: the polyimide solution is the polyimide solution as prepared in synthesis embodiment 5. Others are the same as in the Embodiment 15.

Synthesis Embodiment 6

The polyimide solution is prepared according to the following steps: adding 113 g N,N-dimethylacetamide in a three-neck flask; adding 10.8 g (0.1 mol) p-phenylenediamine to the N,N-dimethylacetamide under a nitrogen atmosphere and stirring for 1 h; then adding 14.71 g (0.05 mol) 3,3',4,4'-biphenyltetracarboxylic dianhydride to the three-neck flask and stirring for 5 hours to obtain a mixed solution;

adding 24.82 g (0.1 mol) 4-phenylethynylphthalic anhydride to the mixed solution, stirring and allowing reaction for 3 hours; then adding 38 g toluene, heating to a temperature of 130° C. and carrying out reflux reaction for 10 hours under a temperature condition of 130° C. to obtain the polyimide solution;

the 3,3',4,4'-biphenyltetracarboxylic dianhydride has a structural formula of:

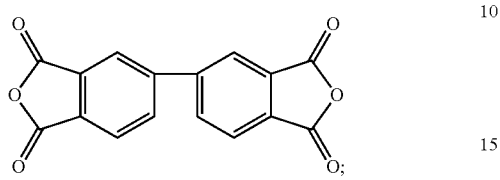

the polyimide in the polyimide solution has a structural formula of:

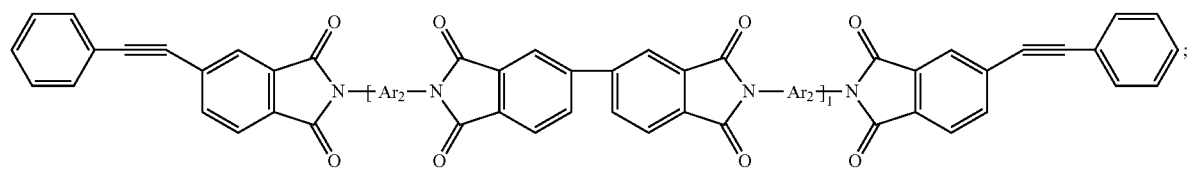

wherein Ar$_2$ has a structural formula of:

Synthesis Embodiment 7

The polyimide solution is prepared according to the following steps: adding 113 g N,N-dimethylacetamide in a three-neck flask; adding 10.8 g (0.1 mol) m-phenylenediamine to the N,N-dimethylacetamide under a nitrogen atmosphere and stirring for 1 h; then adding 14.71 g (0.05 mol) 3,3',4,4'-biphenyltetracarboxylic dianhydride to the three-neck flask and stirring for 5 hours to obtain a mixed solution; adding 24.82 g (0.1 mol) 4-phenylethynylphthalic anhydride to the mixed solution, stirring and allowing reaction for 3 hours; then adding 37 g toluene, heating to a temperature of 130° C. and carrying out reflux reaction for 10 hours under a temperature condition of 130° C. to obtain the polyimide solution;

the 3,3',4,4'-biphenyltetracarboxylic dianhydride has a structural formula of:

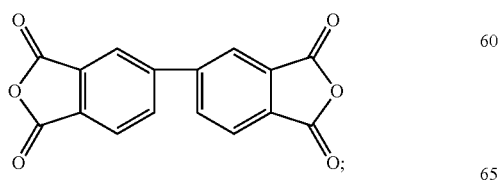

the polyimide in the polyimide solution has a structural formula of:

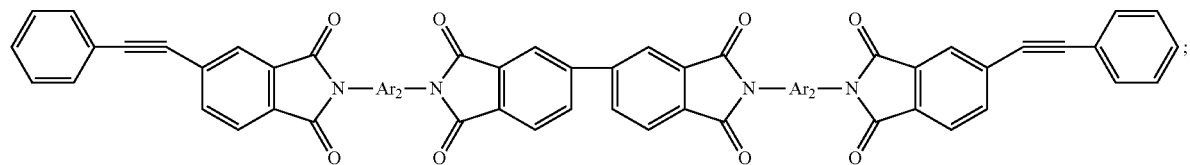

wherein $Ar_2$ has a structural formula of:

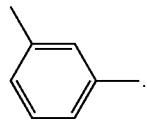

Synthesis Embodiment 8

The polyimide solution is prepared according to the following steps: adding 123 g N,N-dimethylacetamide in a three-neck flask; adding 20.02 g (0.1 mol) 4,4'-diaminodiphenyl ether to the N,N-dimethylacetamide under a nitrogen atmosphere and stirring for 1 h; then adding 25.78 g (0.08 mol) 3,3',4,4'-benzophenonetetracarboxylic dianhydride to the three-neck flask and stirring for 5 hours to obtain a mixed solution; adding 9.93 g (0.04 mol) 4-phenylethynylphthalic anhydride to the mixed solution, stirring and allowing reaction for 3 hours; then adding 41 g toluene, heating to a temperature of 130° C. and carrying out reflux reaction for 10 hours under a temperature condition of 130° C. to obtain the polyimide solution;

the 3,3',4,4'-benzophenonetetracarboxylic dianhydride has a structural formula of:

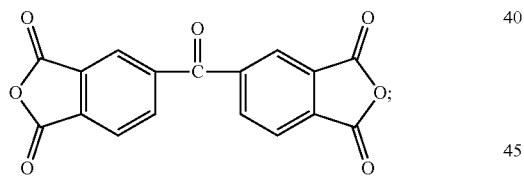

the polyimide in the polyimide solution has a structural formula of:

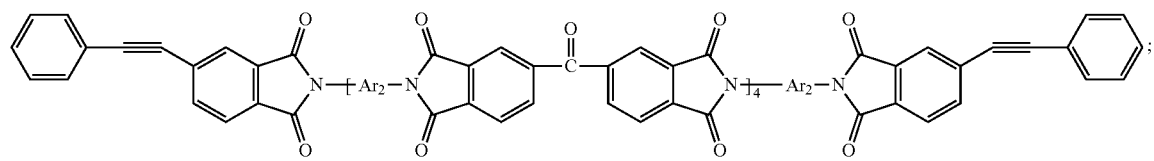

wherein $Ar_2$ has a structural formula of:

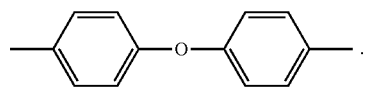

Synthesis Embodiment 9

The polyimide solution is prepared according to the following steps: adding 174 g N,N-dimethylacetamide in a three-neck flask; adding 41.65 g (0.1 mol) aromatic diamine to the N,N-dimethylacetamide under a nitrogen atmosphere and stirring for 1 h; then adding 10.9 g (0.05 mol) of pyromellitic dianhydride to the three-neck flask and stirring for 5 hours to obtain a mixed solution; adding 24.82 g (0.1 mol) 4-phenylethynylphthalic anhydride to the mixed solution, stirring and allowing reaction for 3 hours; then adding 58 g toluene, heating to a temperature of 130° C. and carrying out reflux reaction for 10 hours under a temperature condition of 130° C. to obtain the polyimide solution;

the aromatic diamine has a structural formula of:

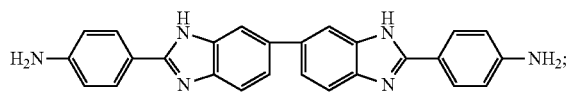

the CAS number of the aromatic diamine is: 4402-17-9;
the polyimide in the polyimide solution has a structural formula of:

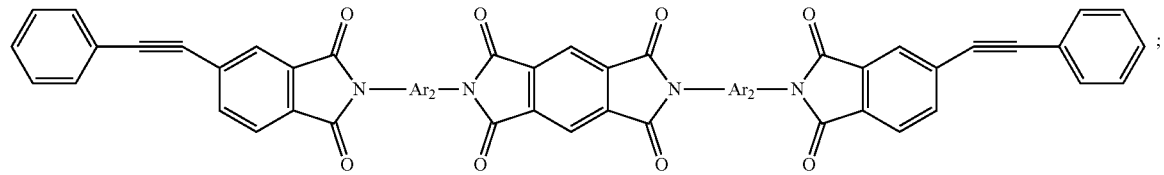

wherein $Ar_2$ has a structural formula of:

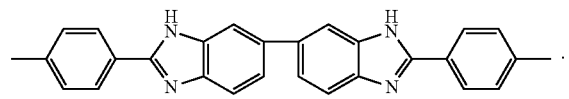

Comparative Experiment 1

(1) weighing to obtain 100 parts of polyimide solution, 20 parts of inorganic filler modifier and 1 part of interface coupling agent; adding 20 parts of inorganic filler modifier and 1 part of interface coupling agent to 100 parts of polyimide solution under a temperature of 90° C. and stirring conditions; and stirring for 30 min to obtain an adhesive agent;

the inorganic filler modifier consists of 17 parts by weight of fumed silica (silicon dioxide in gaseous state) and 3 parts by weight of boron nitride; the interface coupling agent is γ-aminopropyltriethoxysilane; the polyimide solution is the polyimide solution of synthesis embodiment 6;

(2) filtering and degassing the adhesive agent, casting to a rotating drum, which is made of stainless steel and loaded with carrier cloth and release paper, to obtain a self-supporting film; then under a temperature of 60° C., heating for 60 min, then under a temperature of 150° C., heating for 5 min, and finally under a temperature of 60° C., annealing for 5 min to obtain a polyimide film;

the carrier cloth is an E-glass fiberglass cloth having a surface density of 110 g/cm²; the inorganic filler modifier has an average particle size of 5 μm.

Comparative Experiment 2

This comparative experiment differs from comparative experiment 1 in that: the polyimide solution is the polyimide solution as prepared in synthesis embodiment 7. Others are the same as in the comparative experiment 1.

Comparative Experiment 3

This comparative experiment differs from comparative experiment 1 in that: the polyimide solution is the polyimide solution as prepared in synthesis embodiment 8. Others are the same as in the comparative experiment 1.

Comparative Experiment 4

This comparative experiment differs from comparative experiment 1 in that: the polyimide solution is the polyimide solution as prepared in synthesis embodiment 9. Others are the same as in the comparative experiment 1.

Comparative Experiment 5 filtering and degassing the polyimide solution, casting to a rotating drum, which is made of stainless steel and loaded with carrier cloth and release paper, to obtain a self-supporting film; then under a temperature of 60° C., heating for 60 min, then under a temperature of 150° C., heating for 5 min, and finally under a temperature of 60° C., annealing for 5 min to obtain a polyimide film;

the polyimide solution is the polyimide solution as prepared in synthesis embodiment 6; the carrier cloth is an E-glass fiberglass cloth having a surface density of 100 g/cm².

Figure 2:
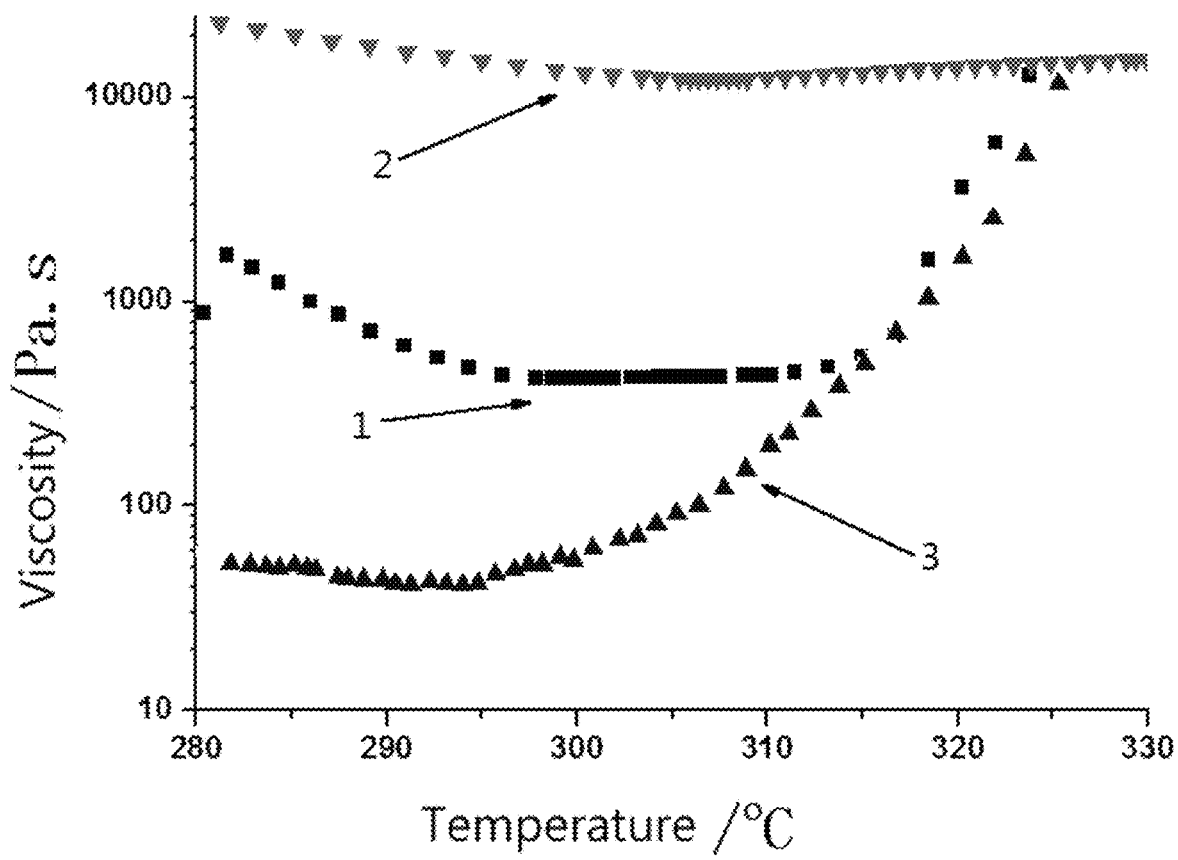
FIG. 2 is a rheological graph, 1 is a rheological curve of polyimide in the polyimide solution prepared in synthesis embodiment 1; 2 is a rheological curve of polyimide in the polyimide solution prepared in synthesis embodiment 6; and 3 is the rheological curve of polyimide in the polyimide solution prepared in synthesis embodiment 3.
Figure 3:
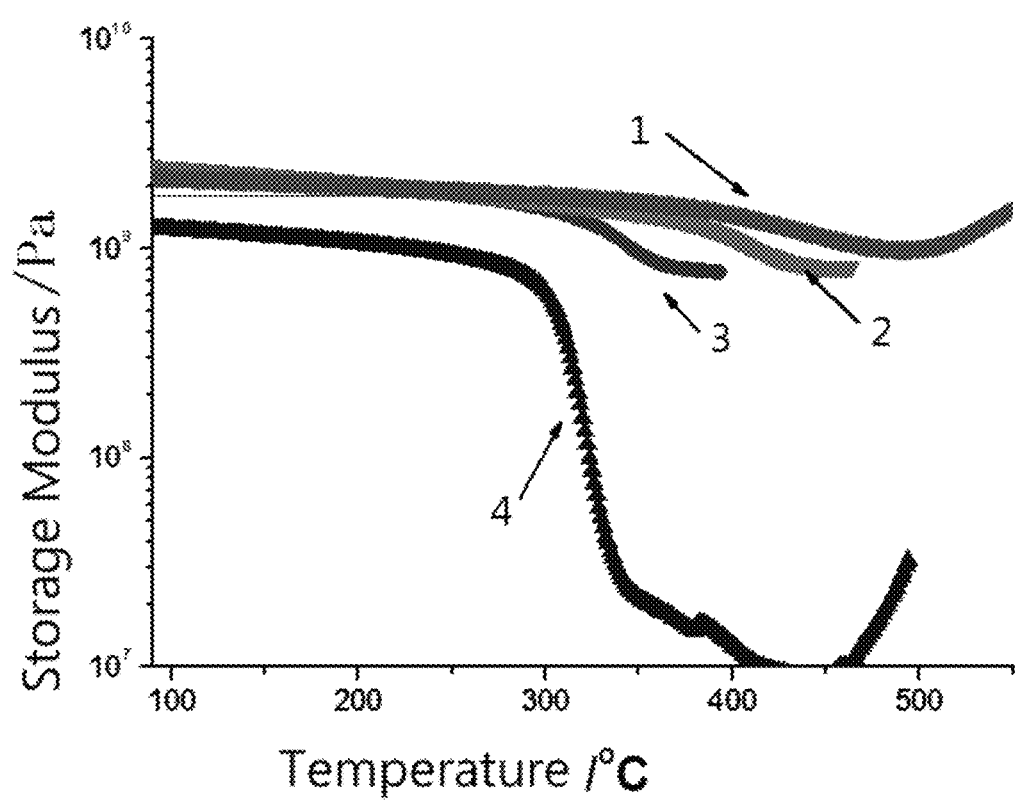
FIG. 3 is a dynamic thermomechanical curve, 1 is a dynamic thermomechanical curve after curing of the polyimide solution prepared in synthesis embodiment 1; 2 is a dynamic thermomechanical curve after curing of the polyimide solution prepared in synthesis embodiment 3; 3 is a dynamic thermomechanical curve after curing of the polyimide solution prepared in synthesis embodiment 5, and 4 is a dynamic thermomechanical curve after curing of the polyimide solution prepared in synthesis embodiment 8.

The polyimide solutions prepared in Synthesis Embodiments 1 to 9 are tested for glass transition temperature, thermal stability, rheology and infrared, results are as shown in Table 1 and FIGS. 1 to 3. The curing process of the polyimide solution is as follows: first, heating for 1 h at a temperature of 180° C. and a pressure of 0.2 MPa, and then heating for 4 h at a temperature of 350° C. and a pressure of 0.2 MPa. Rheological test: The polyimide solution is introduced into distilled water, and the precipitate is washed with water and subjected to a rheological test after drying.

The test conditions for each test item refer to the following standards (methods):

1. The glass transition temperature is a dynamic thermomechanical (DMA). Heating rate: 5° C./min; frequency: 1 Hz.

2. Thermal stability: The test uses a thermogravimetric analyzer (TGA). Heating rate: 10° C./min; test atmosphere: air.

3. Rheology: using a rotary rheometer, heating rate 4° C./min, test atmosphere: air. Frequency: 1 Hz.

4. The infrared spectrum is measured by Fourier transform infrared spectroscopy by using potassium bromide as the background and the number of scans is 128.

The polyimide film prepared in Embodiments 1~19 and Comparative Experiments 1~5 is placed between two material items to be bonded, and the curing process is as follows: first, heating for 1 h at a temperature of 180° C. and a pressure of 0.2 MPa, then heating for 4 h at a temperature of 350° C. and a pressure of 0.2 MPa. Then the bonded material items are tested for shear strength, peel strength and flatwise tensile strength and results are shown in Table 2 and Table 3. The test conditions for each test item refer to the following standards (methods):

1. Shear strength: GB/T7124-2008 Adhesive—Determination of tensile lap-shear strength of rigid-to-rigid bonded assemblies; GJB444-1988 Adhesive high temperature shear strength testing. Material: 304 stainless steel.

2. Peel strength and flatwise tensile strength test: GJB130.7-1986 Test method for climbing drum peel strength of adhesive-bonded aluminum honeycomb-sandwich structure; GJB130.4-1986 Test method for flatwise tensile strength of adhesive-bonded aluminum honeycomb-sandwich structure. The honeycomb is made of titanium alloy honeycomb, and the skin panel is made of titanium alloy plate instead of aluminum alloy.

And for the bonding parts (titanium alloy honeycomb and titanium alloy plate bonding) used in the peel strength and the flatwise tensile strength test, the melt climbing during the curing process is observed, the fillet formation after curing is observed.

FIG. 1 is an infrared spectrum, 1 is an infrared curve after curing of the polyimide solution prepared in synthesis embodiment 1; and 2 is an infrared curve after curing of the polyimide solution prepared in synthesis embodiment 3. From the figure, characteristic absorption peaks of imine, that is asymmetric and symmetrical stretching vibration peaks of carbonyl groups, is observed at both 1780 cm$^{-1}$ and 1720 cm-1; a stretching vibration peak of CN of imide ring and benzimidazole ring is observed at 1380 cm-1; an absorption peak of C=O is observed at 1660 cm-1, showing the presence of dianhydride of benzophenone structure; the N—H bond unique to imidazole is observed in 3000 cm-1~3500 cm-1; the C≡C characteristic peak at 2200 cm-1 is disappeared after curing at 350° C., demonstrating that crosslinking is complete.

FIG. 2 is a rheological graph, 1 is a rheological curve of polyimide in the polyimide solution prepared in synthesis embodiment 1; 2 is a rheological curve of polyimide in the polyimide solution prepared in synthesis embodiment 6; and 3 is the rheological curve of polyimide in the polyimide solution prepared in synthesis embodiment 3. From the figure, the polyimide solutions prepared in Synthesis embodiments 1 and 3 both have a wider processing interval and a lower melt viscosity, ensuring high-temperature meltability and melt climbing ability in the core structure. On the other hand, since the polyimide solution prepared in Synthesis embodiment 6 does not use a benzimidazole diamine containing a flexible carbonyl group, and has a structure with relatively high rigidity such as p-phenylenediamine, this leads to lack of melt viscosity at high temperature, and hence failure to provide climbing ability and bonding to the core structure.

Therefore, all of the polyimide solutions synthesized in the synthesis embodiments 1 to 5 have melt fluidity. With the presence of the inorganic filler, the thixotropy and the fillet formation ability is improved, and a good bonding effect can be obtained.

FIG. 3 is a dynamic thermomechanical curve, 1 is a dynamic thermomechanical curve after curing of the polyimide solution prepared in synthesis embodiment 1; 2 is a dynamic thermomechanical curve after curing of the polyimide solution prepared in synthesis embodiment 3; 3 is a dynamic thermomechanical curve after curing of the polyimide solution prepared in synthesis embodiment 5, and 4 is a dynamic thermomechanical curve after curing of the polyimide solution prepared in synthesis embodiment 8. From FIG. 3 and Table 1, 2 and 3, it can be seen that in the synthesis embodiments 1-5, because of the combination of the benzimidazole ring and the benzoimine ring is used, the Tg is above 390° C., and when the storage modulus exceeds Tg+30° C., a downward trend of less than 0.5 orders of magnitude can still be maintained. Therefore, it provides a basis for the high temperature resistance of 400° C.~450° C. For examples, the embodiments 1 to 19, as prepared by using the synthesis embodiments 1 to 5, have a relatively good shear strength at above 400° C. and a relatively good strength at 260° C. to 300° C. after aging. On the other hand, in the synthesis embodiment 8, the flexible structure diamine is used to provide melt processibility, lower the postcure Tg value, and a decrease in retention rate of the storage modulus (>2 orders of magnitude), therefore no strength at high temperature is observed in comparative experiment 3.

In Embodiments 15 to 19 and Comparative Experiment 5, the inorganic filler modifier is not used, thus resulting in poor surface quality and a high crack depth ratio of the film.

In Embodiments 15 to 19 synthesized by the synthesis embodiments 1~5, the inorganic filler modifier is not added. In Embodiments 6 synthesized by the synthesis embodiments 1, a less amount of the inorganic filler modifier is added. In the above two cases (no or less inorganic filler modifier), the resin has melt flow and climbing ability but no fillet formation at high temperature will occur, thus resulting low core tensile strength and low peel strength. In Embodiments 8 synthesized by the synthesis embodiments 1, an excessive amount of the inorganic filler modifier is added, this leads to bonding of the core structure, no melt climbing ability of the resin and no fillet formation at high temperature, thus also decreasing the plane tensile strength of the core structure and roller peel strength. In Embodiments 6~9 synthesized by the synthesis embodiments 1~5, the comparative embodiment 1, 2, 4 and 5 do not have resin melt fluidity, resulting low plane tensile strength and peel strength of the core structure; the comparative 3 does have resin melt fluidity but does not use a combination of Benzimidazole ring and benzoimine ring, thus resulting low Tg and low shear strength at high temperature.

TABLE 1

Properties comparison table of synthesis embodiment

| | synthesis embodiment 1 | synthesis embodiment 2 | synthesis embodiment 3 | synthesis embodiment 4 | synthesis embodiment 5 | synthesis embodiment 6 | synthesis embodiment 7 | synthesis embodiment 8 | synthesis embodiment 9 |
|---|---|---|---|---|---|---|---|---|---|
| Glass Transition Temp/° C. | 465 | 440 | 445 | 412 | 398 | 480 | 475 | 298 | 473 |
| Initial thermo-gravimetric temp/° C. | 580 | 585 | 575 | 572 | 570 | 590 | 586 | 559 | 585 |

TABLE 2

Properties comparison table of embodiment 1 to 11

| | | Embodiment 1 | Embodiment 2 | Embodiment 3 | Embodiment 4 | Embodiment 5 | Embodiment 6 |
|---|---|---|---|---|---|---|---|
| Film Quality | | Good | Good | Good | Good | Good | Good |
| Shear | 25° C. | 24 | 28 | 27 | 30 | 32 | 26 |
| Strength/ | 300° C. | 23 | 23 | 24 | 21 | 20 | 23 |
| MPa | 400° C. | 15 | 11 | 12 | 9 | 9 | 14 |
| | 450° C. | 13 | 7 | 10 | 6 | 4 | 12 |
| | 500° C. | 8 | 4 | 7 | 3 | 2 | 8 |
| Roller Peel | 25° C. | 74.4 | 89.3 | 85.3 | 98.3 | 116.6 | 28.2 |
| Strength (N · m/m) | 300° C. | 79.2 | 87.3 | 93.6 | 99.3 | 96.1 | 20.4 |
| Planar Tensile Strength/MPa | | 3.7 | 4.2 | 3.9 | 4.1 | 4.2 | 1.2 |
| Melt Climbing | | Good | Good | Good | Good | Good | Good |
| Fillet Formation | | Good | Good | Good | Good | Good | No Fillet Formed |
| Shear strength/MPa at room temperature after heat aging at 260° C. for 500 h | | 25 | 29 | 28 | 30 | 31 | 25 |
| Shear strength/MPa at room temperature after heat aging at 300° C. for 500 h | | 24 | 28 | 26 | 27 | 28 | 22 |

| | | Embodiment 7 | Embodiment 8 | Embodiment 9 | Embodiment 10 | Embodiment 11 |
|---|---|---|---|---|---|---|
| Film Quality | | Good | Good | Good | Good | Good |
| Shear | 25° C. | 20 | 17 | 23 | 27 | 25 |
| Strength/ | 300° C. | 20 | 19 | 24 | 23 | 23 |
| MPa | 400° C. | 15 | 13 | 14 | 12 | 14 |
| | 450° C. | 13 | 13 | 13 | 9 | 11 |
| | 500° C. | 9 | 8 | 8 | 7 | 8 |
| Roller Peel | 25° C. | 43.2 | <10 | 72.1 | 73.1 | 80.3 |
| Strength (N · m/m) | 300° C. | 40.2 | <10 | 74.3 | 76.3 | 83.2 |
| Planar Tensile Strength/MPa | | 2.7 | / | 3.6 | 3.7 | 3.9 |
| Melt Climbing | | Ordinary | No Climbing | Good | Good | Good |
| Fillet Formation | | Ordinary | No Fillet Formed | Good | Good | Good |
| Shear strength/MPa at room temperature after heat aging at 260° C. for 500 h | | 21 | 18 | 21 | 26 | 24 |
| Shear strength/MPa at room temperature after heat aging at 300° C. for 500 h | | 20 | 16 | 19 | 25 | 22 |

TABLE 3

Properties comparison table of embodiment 12 to 19 and comparative experiment 1 to 5

| | | Embodiment 12 | Embodiment 13 | Embodiment 14 | Embodiment 15 | Embodiment 16 | Embodiment 17 | Embodiment 18 |
|---|---|---|---|---|---|---|---|---|
| Film Quality | | Good | Good | Good | Poor surface flatness | Poor surface flatness | Poor surface flatness | Poor surface flatness |
| Shear | 25° C. | 27 | 28 | 25 | 26 | 28 | 28 | 31 |
| Strength/ | 300° C. | 22 | 22 | 23 | 24 | 23 | 24 | 22 |

TABLE 3-continued

Properties comparison table of embodiment 12 to 19 and comparative experiment 1 to 5

| | | | | | | | | |
|---|---|---|---|---|---|---|---|---|
| MPa | 400° C. | 11 | 10 | 13 | 15 | 11 | 11 | 9 |
| | 450° C. | 9 | 7 | 12 | 12 | 6 | 10 | 6 |
| | 500° C. | 6 | 4 | 7 | 8 | 4 | 6 | 3 |
| Roller Peel | 25° C. | 90.2 | 93.2 | 82.3 | 24.0 | 30.2 | 27.2 | 30.2 |
| Strength (N · m/m) | 300° C. | 91.2 | 94.3 | 85.3 | 28.2 | 29.4 | 28.2 | 31.2 |
| Planar Tensile Strength/MPa | | 4.0 | 4.1 | 3.9 | 1.1 | 1.1 | 1.2 | 1.2 |
| Melt Climbing | | Good | Good | Good | Good | Good | Good | Good |
| Fillet Formation | | Good | Good | Good | No fillet | No fillet | No fillet | No fillet |
| Shear strength/MPa at room temperature after heat aging at 260° C. for 500 h | | 27 | 27 | 24 | 26 | 25 | 24 | 28 |
| Shear strength/MPa at room temperature after heat aging at 300° C. for 500 h | | 25 | 25 | 23 | 25 | 20 | 20 | 23 |

| | | Embodiment 19 | Comparative experiment 1 | Comparative experiment 2 | Comparative experiment 3 | Comparative experiment 4 | Comparative experiment 5 |
|---|---|---|---|---|---|---|---|
| Film Quality | | Poor surface flatness | Good | Good | Good | Good | Poor surface flatness |
| Shear | 25° C. | 35 | 19 | 20 | 28 | 20 | 20 |
| Strength/ | 300° C. | 21 | 17 | 17 | 13 | 19 | 17 |
| MPa | 400° C. | 9 | 10 | 10 | 4 | 15 | 9 |
| | 450° C. | 3 | 8 | 7 | 0 | 11 | 8 |
| | 500° C. | 2 | 6 | 5 | 0 | 7 | 5 |
| Roller Peel | 25° C. | 33.2 | <10 | <10 | 17.2 | <10 | <10 |
| Strength (N · m/m) | 300° C. | 31.2 | <10 | <10 | 13.2 | <10 | <10 |
| Planar Tensile Strength/MPa | | 1.2 | / | / | 0.3 | / | / |
| Melt Climbing | | Good | No climbing | No climbing | Good | No climbing | No climbing |
| Fillet Formation | | No fillet | No fillet | No fillet | No fillet | No fillet | No fillet |
| Shear strength/MPa at room temperature after heat aging at 260° C. for 500 h | | 31 | 18 | 19 | 21 | 19 | 27 |
| Shear strength/MPa at room temperature after heat aging at 300° C. for 500 h | | 28 | 16 | 17 | 17 | 15 | 14 |

What is claimed is:

1. A method of preparing heat resistant polyimide film, characterized in that: the method of preparing heat resistant polyimide film comprises the steps of:
   (a) weighing to obtain 100 parts by weight of polyimide solution, 10 parts to 40 parts by weight of inorganic filler modifier and 0.1 parts to 5 parts by weight of interface coupling agent; adding the 10 to 40 parts of inorganic filler modifier and the 0.1 parts to 5 parts of interface coupling agent to the 100 parts of polyimide solution under a temperature of 90° C. to 120° C. while stirring; and stirring for 10 minutes to 30 minutes to obtain an adhesive agent;
   wherein the polyimide solution is manufactured by a process comprising the steps of:
   adding N,N-dimethylacetamide; adding aromatic diamine to the N,N-dimethylacetamide under a nitrogen atmosphere and stirring for 1 hour to 5 hours; then adding aromatic dianhydride and stirring for 1 hour to 5 hours to obtain a mixed solution; adding 4-phenylethynylphthalic anhydride to the mixed solution, stirring and allowing reaction for 1 hour to 5 hours; then adding toluene, heating to a temperature of 120° C. to 130° C. and carrying out reflux reaction for 5 hours to 20 hours under a temperature condition of 120° C.~130° C. to obtain the polyimide solution;
   wherein a molar ratio of the aromatic dianhydride to the aromatic diamine is (0.50~0.95):1; a mass ratio of the N,N-dimethylacetamide to the toluene is 1:(0.2~0.5); a molar ratio of the aromatic diamine to 4-phenylethynylphthalic anhydride is 1:(0.01~1); and a total number of moles of anhydride functional group in the aromatic dianhydride and the 4-phenylethynyl phthalic anhydride is equal to the number of moles of amino functional group of the aromatic diamine;
   a ratio of a total mass of the N,N-dimethylacetamide and the toluene to a total mass of the 4-phenylethynylphthalic anhydride, the aromatic dianhydride and the aromatic diamine is (2.5~4):1;

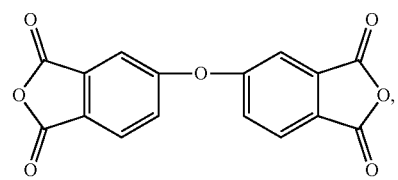

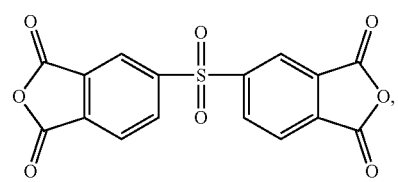

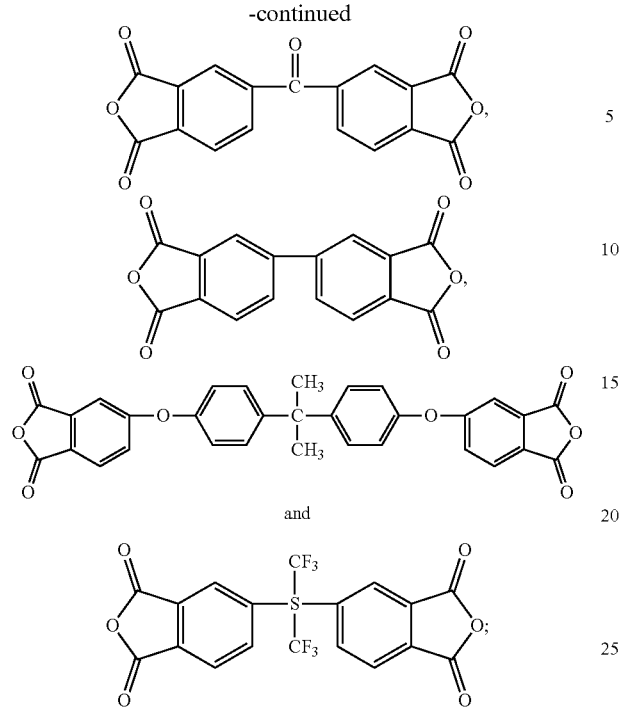

the aromatic diamine has a structural formula of:

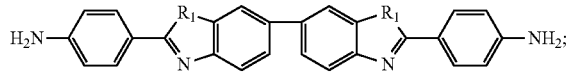

where $R_1$ is O or NH, (b) filtering and degassing the adhesive agent, casting to a drum made of stainless steel and loaded with carrier cloth and release paper to obtain a self-supporting film; then under a temperature of 60° C. to 150° C., heating for 1 min to 60 min, then under a temperature of 150° C. to 300° C., heating for 1 min to 60 min, and finally under a temperature of 50° C. to 140° C., annealing for 1 min to 20 min to obtain the heat resistant polyimide film;

wherein the heat resistant polyimide film has a thickness of 0.30 mm~0.60 mm;

in the step (a), the inorganic filler modifier consists of silicon dioxide (silica)-based substance and substance for increasing interface bonding, and the mass ratio of the silica-based substance and the substance for increasing interface bonding is 1:(0.1~0.5), the silica-based substance is hollow ceramic microspheres, fumed silica (silicon dioxide in gaseous state), fused silica (melted silicon dioxide) or amorphous silica, the substance for increasing interface bonding is one or a mixture of two or more selected from the group consisting of: aluminum hydroxide, magnesium hydroxide, molybdenum oxide, aluminum nitride, aluminum oxide, boron nitride and silicon carbide, in the step (a), the polyimide solution comprises polyimide which has a structural formula of:

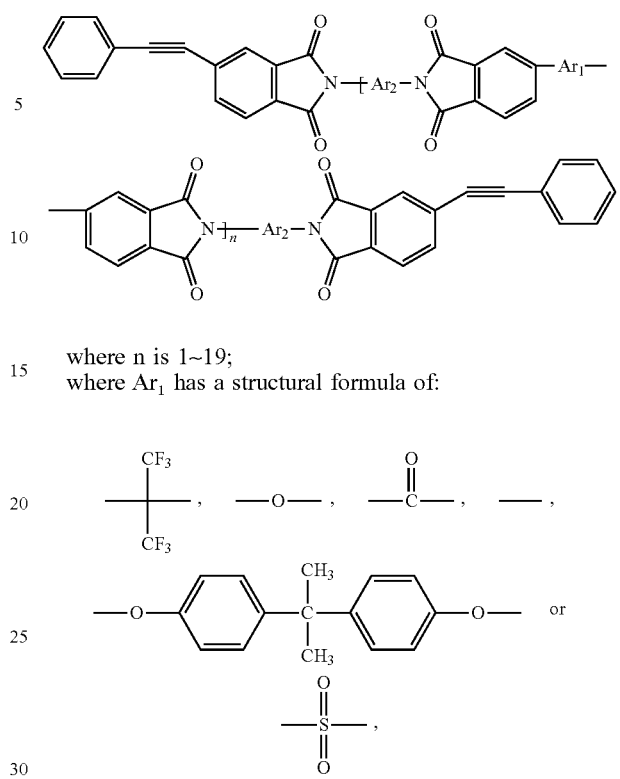

where n is 1~19;
where $Ar_1$ has a structural formula of:

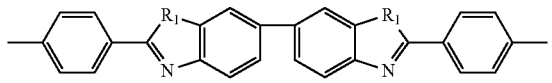

where $Ar_2$ has a structural formula of:

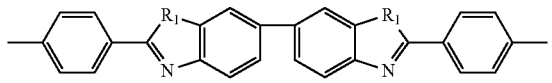

where $R_1$ is O or NH.

2. The method of preparing heat resistant polyimide film according to claim 1, characterized in that: in the step (a), the inorganic filler modifier has an average particle diameter of 0.1 μm to 10 μm.

3. The method of preparing heat resistant polyimide film according to claim 1, characterized in that: in the step (a), the interface coupling agent is a silane coupling agent containing amino end group.

4. The method of preparing heat resistant polyimide film according to claim 3, characterized in that: the silane coupling agent containing amino end group is selected from the group consisting of: γ-aminopropyltriethoxysilane, 3-aminopropyltrimethoxysilane and 3-aminopropylmethyldiethoxysilane.

5. The method of preparing heat resistant polyimide film according to claim 1, characterized in that: in the step (b), the carrier cloth is selected from the group consisting of: E-glass fiberglass cloth, D-glass fiberglass cloth, S-glass fiberglass cloth, NE-glass fiberglass cloth, T-glass fiberglass cloth and Q-glass fiberglass cloth.

6. The method of preparing heat resistant polyimide film according to claim 5, characterized in that: the carrier cloth has a surface density of 100 g/cm²~110 g/cm².

* * * * *